(12) United States Patent
Tateishi et al.

(10) Patent No.: US 8,606,779 B2
(45) Date of Patent: Dec. 10, 2013

(54) SEARCH METHOD, SIMILARITY CALCULATION METHOD, SIMILARITY CALCULATION, SAME DOCUMENT MATCHING SYSTEM, AND PROGRAM THEREOF

(75) Inventors: Kenji Tateishi, Tokyo (JP); Dai Kusui, Tokyo (JP)

(73) Assignee: NEC Corporation, Tokyo (JP)

( * ) Notice: Subject to any disclaimer, the term of this patent is extended or adjusted under 35 U.S.C. 154(b) by 319 days.

(21) Appl. No.: 12/310,975

(22) PCT Filed: Sep. 13, 2007

(86) PCT No.: PCT/JP2007/067831
§ 371 (c)(1),
(2), (4) Date: Mar. 13, 2009

(87) PCT Pub. No.: WO2008/032780
PCT Pub. Date: Mar. 20, 2008

(65) Prior Publication Data
US 2010/0023505 A1 Jan. 28, 2010

(30) Foreign Application Priority Data
Sep. 14, 2006 (JP) .................................. 2006-249429

(51) Int. Cl.
*G06F 17/30* (2006.01)
*G06F 17/00* (2006.01)

(52) U.S. Cl.
USPC ............................ 707/730; 707/729; 715/200

(58) Field of Classification Search
USPC ......................................................... 707/730
See application file for complete search history.

(56) References Cited

U.S. PATENT DOCUMENTS

| 6,311,198 | B1 | 10/2001 | Uramoto et al. | |
| 6,542,889 | B1* | 4/2003 | Aggarwal et al. | 1/1 |
| 7,406,479 | B2* | 7/2008 | Shriraghav et al. | 1/1 |
| 7,451,139 | B2* | 11/2008 | Namba | 1/1 |
| 2008/0059512 | A1* | 3/2008 | Roitblat et al. | 707/102 |
| 2008/0319995 | A1* | 12/2008 | Alspector et al. | 707/6 |
| 2010/0023505 | A1* | 1/2010 | Tateishi et al. | 707/5 |

FOREIGN PATENT DOCUMENTS

| JP | 04-175874 | 6/1992 |
| JP | 08-272813 | 10/1996 |
| JP | 11-053387 | 2/1999 |
| JP | 2003-050823 A | 2/2003 |
| JP | 2003-263443 A | 9/2003 |

OTHER PUBLICATIONS

Chaudhuri et al., A Primitive Operator for Similarity Joins in Data Cleaning, ICDE, Apr. 24, 2006.*

(Continued)

*Primary Examiner* — Don Wong
*Assistant Examiner* — Theodore Hebert
(74) *Attorney, Agent, or Firm* — Foley & Lardner LP

(57) ABSTRACT

Same document group creation means (11) acquires a ratio of common words and characters between documents in order to obtain a predetermined similarity greater than a predetermined threshold value between the documents. According to the ratio, words or characters are selected with a common priority in all the documents to be matched. The documents are correlated to the same document candidate group identified by the selected words or characters and stored in a same group candidate group storage unit (22).

16 Claims, 29 Drawing Sheets

(56) References Cited

OTHER PUBLICATIONS

Chaudhuri et al., "A Primitive Operator for Similarity Joins in Data Cleaning" (ICDE Apr. 24, 2006).*

Sunita Sarawagi & Alok Kirpal, Efficient Set Joins on Simlarity Predicates, ACM (2004).*

Sunita Sarawagi & Alok Kirpal, Efficient Set Joins on Similarity Predicates, ACM (2004).*

M. A. Hernandez et al., "The Merge/Purge Problem for Large Databases," Proceedings of the 1995 ACM SIGMOD International Conference on Management of Data, 1995, pp. 127-138.

A. K. Jain, "Data Clustering: A Review," ACM Computing Surveys, vol. 31, No. 3, 1999, pp. 264-323.

C. Kikuchi, "Nihongo Bunsho-yo Kosoku Zenbun Kensaku no Ichi shuho," The transactions of the Institute of Electronics, Information and Communication Engineers, Sep. 1992, vol. J75-D1:9, pp. 836-846.

H. Saito et al., "Dogisei Hantei Rule O Mochiita Chofuku Recode Shogo System," Dai 68 Kai (Heisei 18 Nen) Zenkoku Taikai Koen Ronbunshu (2) Jinko Chino to Ninchi Kagaku, Mar. 2006, pp. 2-105-2-106.

T. Tokunaga, "Languages and Computations," vol. 5, Information Retrieval and Text Processing, University of Tokyo Press, 6 pages.

* cited by examiner

FIG. 3

PRIORITIES OF CHARACTERS
(d)   M>A>I>K>L>C>B>D>E>F>G>H>J (a)   SIMILARITY THRESHOLD OF 90%

| | | | | | | | | | | | |
|---|---|---|---|---|---|---|---|---|---|---|---|
| DOCUMENT 1 | A | B | C | D | E | F | G | H | I | J | |
| DOCUMENT 2 | | B | C | D | E | F | G | H | | J | K | L |
| DOCUMENT 3 | | B | C | D | E | F | G | H | I | J | | L |
| DOCUMENT 4 | | B | | D | E | F | G | H | | J | K | L |
| DOCUMENT 5 | A | B | C | D | E | F | G | H | | J | | | M |

FIG. 7

| WORD | NUMBER OF DOCUMENTS WHERE IT APPEARS | PRIORITY |
|---|---|---|
| A | 2 | 1 |
| B | 3 | 7 |
| C | 3 | 8 |
| D | 3 | 9 |
| E | 4 | 11 |
| F | 3 | 10 |
| G | 2 | 2 |
| H | 4 | 12 |
| I | 2 | 3 |
| J | 4 | 13 |
| K | 2 | 4 |
| L | 2 | 5 |
| M | 2 | 6 |

FIG. 9

| WORD | SAME DOCUMENT CANDIDATE GROUP |
|---|---|
| A | DOCUMENT 1, DOCUMENT 5 |
| B | DOCUMENT 1, DOCUMENT 3, DOCUMENT 5 |
| C | DOCUMENT 1, DOCUMENT 3, DOCUMENT 5 |
| D | DOCUMENT 3 |
| E | DOCUMENT 2 |
| F |  |
| G | DOCUMENT 2, DOCUMENT 4 |
| H |  |
| I | DOCUMENT 1, DOCUMENT 3 |
| J |  |
| K | DOCUMENT 4, DOCUMENT 6 |
| L | DOCUMENT 2, DOCUMENT 4 |
| M | DOCUMENT 5 |

FIG. 11

$\text{sim}(1, 3) = 7/\sqrt{9} \times \sqrt{7} = 0.88$ $\text{sim}(1, 5) = 6/\sqrt{9} \times \sqrt{7} = 0.76$ $\text{sim}(2, 4) = 5/\sqrt{5} \times \sqrt{6} = 0.91$ $\text{sim}(3, 5) = 4/\sqrt{7} \times \sqrt{7} = 0.57$ $\text{sim}(4, 6) = 1/\sqrt{6} \times \sqrt{2} = 0.29$

| DOCUMENT 1 | DOCUMENT 3 |
|---|---|
| DOCUMENT 1 | DOCUMENT 5 |
| DOCUMENT 2 | DOCUMENT 4 |

(b)

| | |
|---|---|
| 1 | DOCUMENT 1 |
| 1 | DOCUMENT 3 |
| 1 | DOCUMENT 5 |
| 2 | DOCUMENT 2 |
| 2 | DOCUMENT 4 |

(c)

| DOCUMENT 1 | DOCUMENT 3 |
|---|---|
| DOCUMENT 1 | DOCUMENT 5 |
| DOCUMENT 2 | DOCUMENT 4 |
| DOCUMENT 3 | DOCUMENT 1 |
| DOCUMENT 4 | DOCUMENT 5 |
| DOCUMENT 5 | DOCUMENT 1 |

FIG. 13

| DOCUMENT | SELECTED WORD |
|---|---|
| DOCUMENT 1 | A, B, C, I |
| DOCUMENT 2 | E, G, L |
| DOCUMENT 3 | B, C, D, I |
| DOCUMENT 4 | G, L, K |
| DOCUMENT 5 | A, B, C, M |
| DOCUMENT 6 | K |

FIG. 18

| WORD | SAME DOCUMENT CANDIDATE GROUP |
|---|---|
| A | DOCUMENT 1, DOCUMENT 5 |
| B | DOCUMENT 1, DOCUMENT 3, DOCUMENT 5 |
| C | DOCUMENT 1, DOCUMENT 3 |
| D | |
| E | DOCUMENT 2 |
| F | |
| G | DOCUMENT 2, DOCUMENT 4 |
| H | |
| I | DOCUMENT 1, DOCUMENT 3 |
| J | |
| K | DOCUMENT 4, DOCUMENT 6 |
| L | DOCUMENT 2, DOCUMENT 4 |
| M | DOCUMENT 5 |

FIG. 20 sim (1, 3) = (9+7-2)/(9+7) = 0.88 sim (1, 5) = (9+7-4)/(9+7) = 0.75 sim (2, 4) = (5+6-1)/(5+6) = 0.91 sim (3, 5) = (7+7-6)/(7+7) = 0.57 sim (4, 6) = (6+2-6)/(6+2) = 0.25

FIG. 21

| DOCUMENT | SELECTED CHARACTER |
|---|---|
| DOCUMENT 1 | A, B, C, I |
| DOCUMENT 2 | E, G, L |
| DOCUMENT 3 | B, C, I |
| DOCUMENT 4 | G, L, K |
| DOCUMENT 5 | A, B, M |
| DOCUMENT 6 | K |

FIG. 25

| Document | Words |
|---|---|
| DOCUMENT 1 | A    D    G  I    K L |
| DOCUMENT 2 | C D  F G H I  K      P  R |
| DOCUMENT 3 | B C D  F      J K    N  P  R |
| DOCUMENT 4 | A    F G  I J K L    O P  R |
| DOCUMENT 5 | B  D    G  I    K    N  P  R |
| DOCUMENT 6 | A  C D  F    I    K      P      S |
| DOCUMENT 7 | D E F    I    K L M  P          T |
| DOCUMENT 8 | C    E F G  I J K              T |
| DOCUMENT 9 | E F G  I J K          Q  T |
| DOCUMENT 10 | C D  F    H I J K              T |

FIG. 26

| WORD | APPEARANCE FREQUENCY | PRIORITY |
|---|---|---|
| A | 3 | 8 |
| B | 2 | 5 |
| C | 5 | 13 |
| D | 7 | 17 |
| E | 3 | 9 |
| F | 8 | 18 |
| G | 6 | 15 |
| H | 2 | 6 |
| I | 9 | 19 |
| J | 5 | 14 |
| K | 10 | 20 |
| L | 3 | 10 |
| M | 1 | 1 |
| N | 2 | 7 |
| O | 1 | 2 |
| P | 6 | 16 |
| Q | 1 | 3 |
| R | 4 | 11 |
| S | 1 | 4 |
| T | 4 | 12 |

FIG. 27

| DOCUMENT 1 | A | | D | | | G | I | | K | L | | | | | | |
|---|---|---|---|---|---|---|---|---|---|---|---|---|---|---|---|---|
| DOCUMENT 2 | | C | D | | F | G | H | I | | K | | | | P | | R |
| DOCUMENT 3 | B | C | D | | F | | | | J | K | | | N | P | | R |
| DOCUMENT 4 | A | | | | F | G | | I | J | K | L | | O | P | | R |
| DOCUMENT 5 | B | | D | | | G | | I | | K | | | N | P | | R |
| DOCUMENT 6 | A | C | D | | F | | | I | | K | | | | P | | S |
| DOCUMENT 7 | | | D | E | F | | | I | | K | L | M | | P | | T |
| DOCUMENT 8 | | C | | E | F | G | | I | J | K | | | | | | T |
| DOCUMENT 9 | | | | E | F | G | | I | J | K | | | | | Q | T |
| DOCUMENT 10 | | C | D | | F | | H | I | J | K | | | | | | T |

FIG. 28

| A | 1, 4, 6 |
|---|---|
| B | 3, 5 |
| C | 2, 6, 8, 10 |
| D | |
| E | 7, 8, 9 |
| F | |
| G | |
| H | 2, 10 |
| I | |
| J | |
| K | |
| L | 1, 4, 7 |
| M | 7 |
| N | 3, 5 |
| O | 4 |
| P | |
| Q | 9 |
| R | 2, 3, 5 |
| S | 6 |
| T | 8, 9, 10 |

FIG. 29

| DOCUMENT | SELECTED WORDS |
|---|---|
| DOCUMENT 1 | A, L |
| DOCUMENT 2 | C, H, R |
| DOCUMENT 3 | B, N, R |
| DOCUMENT 4 | A, L, O |
| DOCUMENT 5 | B, N, R |
| DOCUMENT 6 | A, C, S |
| DOCUMENT 7 | E, L, M |
| DOCUMENT 8 | C, E, T |
| DOCUMENT 9 | E, Q, T |
| DOCUMENT 10 | C, H, T |

FIG. 30

| WORD | SCORE | PRIORITY |
|---|---|---|
| A | 3+3=6 | 12 |
| B | 2+2=4 | 7 |
| C | 5+4=9 | 19 |
| D | 7+0=7 | 16 |
| E | 3+3=6 | 11 |
| F | 8+0=8 | 17 |
| G | 6+0=6 | 10 |
| H | 2+2=4 | 6 |
| I | 9+0=9 | 18 |
| J | 5+0=5 | 8 |
| K | 10+0=10 | 20 |
| L | 3+4=7 | 15 |
| M | 1+1=2 | 4 |
| N | 2+2=4 | 5 |
| O | 1+1=2 | 3 |
| P | 6+0=6 | 9 |
| Q | 1+1=2 | 2 |
| R | 4+3=7 | 14 |
| S | 1+1=2 | 1 |
| T | 4+3=7 | 13 |

FIG. 31

| | | | | | | | | | | | | |
|---|---|---|---|---|---|---|---|---|---|---|---|---|
| DOCUMENT 1 | A | | D | | | G | I | | K | L | | |
| DOCUMENT 2 | | C | D | | F | G | H | I | K | | P | R |
| DOCUMENT 3 | B | C | D | | F | | | J | K | N | P | R |
| DOCUMENT 4 | A | | | | F | G | | I J | K | L | O P | R |
| DOCUMENT 5 | B | | D | | | G | | I | K | N | P | R |
| DOCUMENT 6 | A | C | D | | F | | | I | K | | P | S |
| DOCUMENT 7 | | | D | E | F | | | I | K L M | | P | T |
| DOCUMENT 8 | | C | | E | F G | | | I J | K | | | T |
| DOCUMENT 9 | | | | E | F G | | | I J | K | | Q | T |
| DOCUMENT 10 | | C | D | | F | | H | I J | K | | | T |

FIG. 32

| | |
|---|---|
| A | 6 |
| B | 3, 5 |
| C | |
| D | |
| E | 8 |
| F | |
| G | 1, 2, 8, 9 |
| H | 2, 10 |
| I | |
| J | 3, 4, 8, 9, 10 |
| K | |
| L | 1, 7 |
| M | 7 |
| N | 3, 5 |
| O | 4 |
| P | 2, 4, 5, 6, 7 |
| Q | 9 |
| R | |
| S | 6 |
| T | 10 |

FIG. 33

| DOCUMENT | SELECTED WORDS |
|---|---|
| DOCUMENT 1 | G, L |
| DOCUMENT 2 | G, H, P |
| DOCUMENT 3 | B, J, N |
| DOCUMENT 4 | J, O, P |
| DOCUMENT 5 | B, N, P |
| DOCUMENT 6 | A, P, S |
| DOCUMENT 7 | L, M, P |
| DOCUMENT 8 | E, G, J |
| DOCUMENT 9 | G, J, Q |
| DOCUMENT10 | H, J, T |

FIG. 35

| SIMILARITY CALCULATION | ONLY 1ST SAME DOCUMENT CANDIDATE GROUP STORAGE SECTION | 1ST+2ND SAME DOCUMENT CANDIDATE GROUP STORAGE SECTIONS |
|---|---|---|
| sim (1, 4) | ○ | |
| sim (1, 6) | ○ | |
| sim (1, 7) | ○ | ○ |
| sim (2, 3) | ○ | |
| sim (2, 5) | ○ | ○ |
| sim (2, 6) | ○ | ○ |
| sim (2, 8) | ○ | ○ |
| sim (2, 10) | ○ | ○ |
| sim (3, 5) | ○ | ○ |
| sim (4, 6) | ○ | ○ |
| sim (4, 7) | ○ | ○ |
| sim (6, 8) | ○ | |
| sim (6, 10) | ○ | |
| sim (7, 8) | ○ | |
| sin (7, 9) | ○ | |
| sim (8, 9) | ○ | ○ |
| sim (8, 10) | ○ | ○ |
| sim (9, 10) | ○ | ○ |

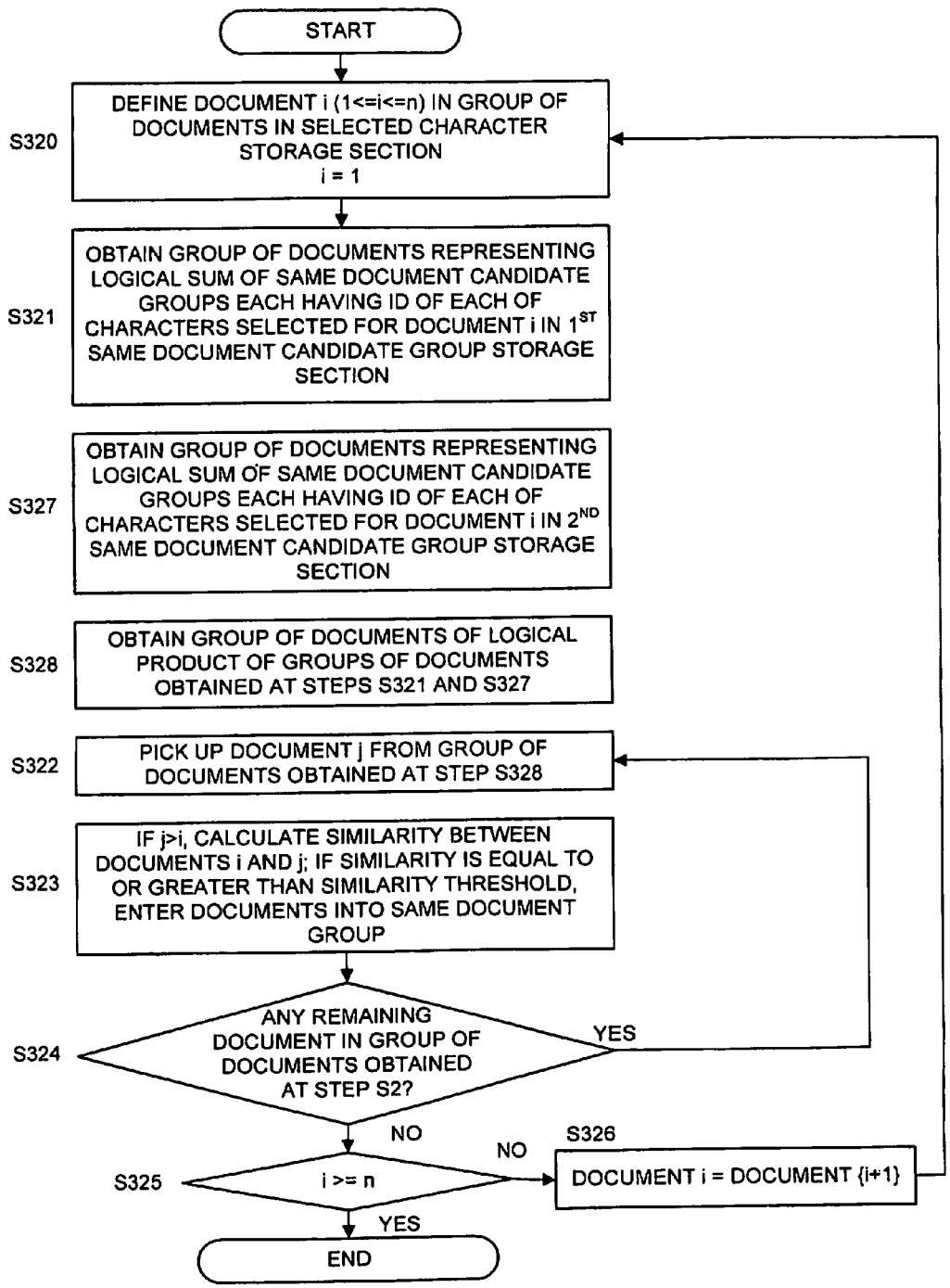

SEARCH METHOD, SIMILARITY CALCULATION METHOD, SIMILARITY CALCULATION, SAME DOCUMENT MATCHING SYSTEM, AND PROGRAM THEREOF

TECHNICAL FIELD

The present invention relates to techniques of search methods and similarity calculation methods for information, and particularly to methods for searching for information having a similarity not equal to or greater than a predetermined similarity, and techniques employing such search methods to perform similarity calculation with an exact solution without any omission in matching and at a high speed.

BACKGROUND ART

There have been proposed numerous techniques for deciding identicalness or similarity of information such as documents or images, among which a technique of same document matching for deciding identicalness of documents is renown. Same document matching refers to a technique of grouping documents that are substantially the same. The term "substantially the same" refers to a condition in which two notationally different materials are decided to be identical by human vision.

Same document matching is required in the following situations, for example:

(1) Redundant Record Matching for a Database (sometimes abbreviated as DB Hereinbelow)

Redundant record matching for a DB refers to grouping of substantially the same records in a DB, and is required in, for example, data cleaning in combining customer DB's that are managed by different people, in different places or according to different methods and that incorporate therein notational variations, or redundancy deletion of inquiry cases in a contact center. When one document is regarded as one record, this can be considered as a problem of same document matching.

(2) Topic Analysis

Topic analysis refers to grouping of posted data such as those in blogs, and is required in knowing when and where the same subject becomes a topic in a blog.

A same document matching system is input with a set of documents of interest and a similarity threshold serving as a condition that documents are regarded as substantially the same, and outputs same document groups. For example, a case as shown in FIG. 1(a) will be described, where five documents and a similarity threshold of 90% are input. In this case, every document is composed of ten alphabetical characters, and a similarity of 90% between document x and document y means that nine characters out of 10 characters in x and those in y are present in common. The system then outputs pairs of two different documents having a similarity equal to or greater than 90% as same document groups as shown in FIG. 1(b). Moreover, the document pairs containing common documents may be combined to form a same document group as shown in FIG. 1(c).

One conventional technique for implementing a same document matching system employs hierarchical clustering (see Paragraph 2.5.7 in Non-patent Document 1). The method calculates a similarity for all document pairs beforehand (Step 1). Next, the document pairs are sequentially combined starting from a pair having the highest similarity to thereby hierarchically group the documents (Step 2). The same document matching system can provide same document groups by calculating similarities of all pairs of two different documents as in Step 1, and thereafter, leaving only document pairs having a similarity equal to or greater than a similarity threshold.

In the example of FIG. 1, the number of all pairs of two different documents is 5*(5−1)/2=10, and hence, the similarity is calculated ten times to output the result shown in FIG. 1(b) or (c).

Another conventional technique for implementing a same document matching system employs redundant record matching for DB's (see Non-patent Document 2). The method involves first sorting records in DB's, next performing similarity calculation on a record pair of each sorted record and 'n' preceding records, and defining a record pair having a similarity equal to or greater than a threshold as redundant record.

A similar technique thereto can be applied to the same document matching system by substituting records with documents. For example, sorting of the documents in FIG. 1(a) by character string results in FIG. 2(a). Next, similarity calculation is applied to a document pair of each document and one preceding document, and then, the similarity is calculated four times and a result shown in FIG. 2(b) or (c) is output.

Moreover, still another conventional technique for implementing a same document matching system employs K-means (see Paragraph 5.2 in Non-patent Document 3). The method involves a premise that a set of documents should be divided into K groups, and based on that premise, K randomly selected documents are assumed to serve as centers of groups, respectively, and the rest of the documents are classified so that each document having a highest similarity with one of the center documents of the K groups is classified into that group.

A similar technique thereto can be applied to the same document matching system by posing a restriction of a similarity threshold on the K-means. Specifically, assuming that K randomly selected documents serve as centers of groups, respectively, the rest of the documents may be classified so that each document having a highest similarity with one of the center documents of the K groups and having a similarity equal to or greater than a threshold is classified into that group.

Non-patent Document 1: Takenobu TOKUNAGA, "Languages and Computations, Vol. 5, Information Retrieval and Text Processing," University of Tokyo Press.

Non-patent Document 2: Mauricio A. Hernandez and Salvatore J. Stolfo, "The Merge/Purge Problem for Large Databases," Proceedings of the 1995 ACM SIGMOD International Conference on Management of Data, pp. 127-138, 1995.

Non-patent Document 3: Jain, A. K., Murty M. N., and Flynn P. J., "Data Clustering: A Review," ACM Computing Surveys, Vol. 31, No. 3, pp. 264-323, 1999.

DISCLOSURE OF THE INVENTION

Problems to be Solved by the Invention

A problem of the conventional techniques for implementing a same document matching system is that: for the techniques disclosed in Non-patent Documents 1 and 2, it is difficult to achieve both effects of keeping a short time in matching and reducing omission in matching.

The method employing hierarchical clustering disclosed in Non-patent Document 1 calculates similarities of all pairs of two different documents, and therefore, no omission in matching occurs; however, when a large number of documents are subjected to matching, the method is significantly time-consuming in matching due to combinatorial explosion.

The method employing redundant record matching disclosed in Non-patent Document 2 performs similarity calculation only on a record pair of each sorted record and 'n' preceding records, and therefore, the time taken in matching may be reduced for a smaller value of 'n' but at the cost of omission in matching of same documents except the 'n' preceding records. Indeed, the example shown in FIG. 2 gives rise to omission in matching in the document pair of documents 1 and 3 having a similarity of 90%.

The method disclosed in Non-patent Document 3 requires specification of the number of same document groups, but it is difficult for a user to predict beforehand the number of same document groups that should be contained in the set of documents to be matched. Moreover, since the time taken in matching is proportional to the specified number of same document groups, it is difficult to keep a short time in matching for a large number of same document groups.

These problems apply not only to document matching but also to decision of identicalness or similarity of other kinds of information such as images.

The present invention has been made in view of such problems, and its object is to provide search and similarity calculation methods capable of reducing the number of operations in similarity calculation required to calculate a similarity of information.

Another object of the present invention is to provide a same document matching system eliminating the need of advance specification of the number of same document groups, with an exact solution without any omission in matching, and capable of operating at a high speed even for a large number of same document groups.

Means to Solve the Problem

The present invention for solving the above-mentioned problems is a search method of searching for pairs of pieces of information having a similarity not equal to or greater than a predetermined similarity, comprising: obtaining a rate of information elements constituting a piece of information that are present in common between pieces of information so that the pair of pieces of information has a similarity of at least equal to or greater than the predetermined similarity; determining a selecting number of information elements to be selected in each piece of information based on said rate; selecting said selecting number of information elements to be selected from each said piece of information according to priorities of the information elements applied in common to a group of pieces of information to be subjected to matching; and searching for pairs of pieces of information having no common selected information element between the pieces of information.

The present invention for solving the above-mentioned problems is a similarity calculation method of calculating a similarity of a pair of pieces of information having a similarity equal to or greater than a predetermined similarity, comprising: obtaining a rate of information elements constituting a piece of information that are present in common between pieces of information so that the pair of pieces of information has a similarity of at least equal to or greater than the predetermined similarity; determining a selecting number of information elements to be selected in each piece of information based on said rate; selecting said selecting number of information elements to be selected from each said piece of information according to priorities of the information elements applied in common to a group of pieces of information to be subjected to similarity calculation; and performing similarity calculation on pairs of pieces of information except those having no common selected information element between the pieces of information.

The present invention for solving the above-mentioned problems is a similarity calculation system for calculating a similarity of a pair of pieces of information having a similarity equal to or greater than a predetermined similarity, comprising: a priority storage section in which priorities of information elements constituting a piece of information are stored, said priorities being applied in common to a group of pieces of information to be subjected to similarity calculation; information element selecting means for obtaining a rate of said information elements that are present in common between pieces of information so that the pair of said pieces of information has a similarity of at least equal to or greater than the predetermined similarity, determining a selecting number of information elements to be selected in each piece of information based on said rate, and selecting said selecting number of information elements to be selected from each said piece of information according to said priorities; and similarity calculating means for performing similarity calculation on pairs of pieces of information except those having no common selected information element between the pieces of information.

The present invention for solving the above-mentioned problems is a same document matching system for forming a group of substantially same documents among given documents, comprising: a same document candidate group storage section in which correspondence between a same document candidate group, which is a group of documents distinguished by words or characters and including candidates of substantially same documents, and a document belonging to said group is stored; and same document candidate group creating means for obtaining a rate of words or characters that are present in common between documents so that the documents have a similarity of at least equal to or greater than a predetermined similarity threshold, selecting words or characters according to priorities for use in common to all documents to be subjected to document matching based on said rate, and storing a document into said same document candidate group storage section, said document being correlated with a same document candidate group distinguished by each said selected word or character.

The present invention for solving the above-mentioned problems is a similarity calculation program for calculating a similarity of a pair of pieces of information having a similarity equal to or greater than a predetermined similarity, wherein the program causes information processing to execute the processing of: obtaining a rate of information elements constituting a piece of information that are present in common between pieces of information so that the pair of pieces of information has a similarity of at least equal to or greater than the predetermined similarity; determining a selecting number of information elements to be selected in each piece of information based on said rate; selecting said selecting number of information elements to be selected from each said piece of information according to priorities of the information elements applied in common to a group of pieces of information to be subjected to similarity calculation; and performing similarity calculation on pairs of pieces of information except those having no common selected information element between the pieces of information.

The present invention for solving the above-mentioned problems is a same document matching program for forming a group of substantially same documents among given documents, wherein the program causes information processing to execute the processing of: obtaining a rate of words or characters that are present in common between documents so that the documents have a similarity of at least equal to or greater than a predetermined similarity threshold; selecting words or characters according to priorities for use in common to all documents to be subjected to document matching based on said rate; and storing a document correlated with a same document candidate group distinguished by each said selected word or character.

Effects of the Invention

An effect of the present invention is to reduce the number of operations in similarity calculation required to calculate a similarity of information. This is because pairs of pieces of information having a similarity equal to or smaller than a similarity threshold, which information should be excluded in similarity calculation, are searched for, and such pairs of pieces of information are excluded in similarity calculation.

Another effect of the present invention is that it is possible to achieve matching of same documents eliminating the need of advance specification of the number of groups, with an exact solution without any omission in matching, and capable of operating at a high speed even for a larger number of groups. The reason of the high speed is that document pairs to be subjected to similarity calculation are limited to those belonging to the identical same document candidate group.

The reason of the exact solution without any omission in matching is that a number or kind of words or characters such that at least one word or character is necessarily present in common between documents having a similarity equal to or greater than a similarity threshold are selected from among words or characters contained in a document for use in document group creation.

The reason that the need of advance specification of the number of same document groups is eliminated and matching is achieved at a high speed for a large number of same document groups is that it is possible to create a same document group even when the number of same document groups is not given in advance.

BRIEF DESCRIPTION OF THE DRAWINGS

FIG. 3 A diagram for explaining an overview of the present invention.

FIG. 7 A diagram showing an example of storage in a priority storage section 21 in the first and second embodiments of the present invention.

FIG. 9 A diagram showing an example of storage in a same document candidate group storage section 22 in the first embodiment of the present invention.

FIG. 11 A diagram showing exemplary similarity calculation in the first embodiment of the present invention.

FIG. 12 A diagram showing examples of storage in an output database 5 in the first and second embodiments of the present invention.

FIG. 13 A diagram showing an example of storage in a selected word storage section in the first embodiment of the present invention.

FIG. 18 A diagram showing an example of storage in the same document candidate group storage section 22 in the second embodiment of the present invention.

FIG. 20 A diagram showing exemplary similarity calculation in the second embodiment of the present invention.

FIG. 21 A diagram showing an example of storage in a selected character storage section in the second embodiment of the present invention.

FIG. 25 A diagram showing an example of storage in the word storage section 20 in the third embodiment and in the object database 3 in a fourth embodiment of the present invention.

FIG. 26 A diagram showing an example of storage in the priority storage section 21 for the first time in the third and fourth embodiments of the present invention.

FIG. 27 A flow chart showing an operation of a same document candidate group creating means 11 for the first time in the third embodiment of the present invention.

FIG. 28 A diagram showing an example of storage in a same document candidate group storage section 22 for the first time in the third and fourth embodiments of the present invention.

FIG. 29 A diagram showing an example of storage in the selected document storage section for the first time in the third embodiment and in the selected character storage section for the first time in the fourth embodiment of the present invention.

FIG. 30 A diagram showing an example of storage in the priority storage section 21 for the second time in the third and fourth embodiments of the present invention.

FIG. 31 A diagram showing a processing image of same document candidate group creating means for the second time in the third and fourth embodiments of the present invention.

FIG. 32 A diagram showing an example of storage in the same document candidate group storage section 22 for the second time in the third and fourth embodiments of the present invention.

FIG. 33 A diagram showing an example of storage in the selected document storage section for the second time in the third embodiment of the present invention and in the selected character storage section for the second time in the fourth embodiment.

FIG. 35 A diagram for comparing the number of operations in similarity calculation in the first or second embodiment with that in the third or fourth embodiment of the present invention.

FIG. 38 A flow chart showing an operation of the same document group creating means 12 in the fourth embodiment of the present invention.

EXPLANATION OF SYMBOLS

Figure 1:
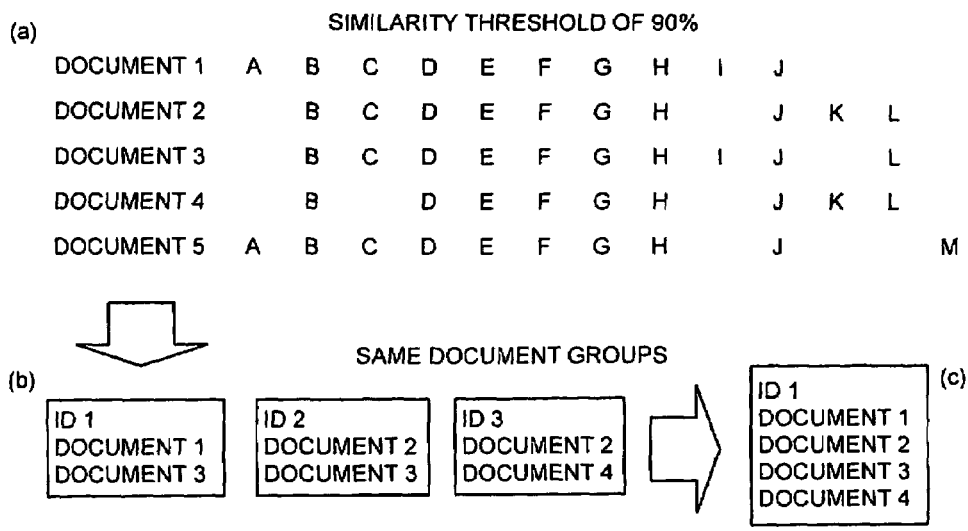
FIG. 1 A diagram for explaining a conventional technique described in the BACKGROUND section.
Figure 2:
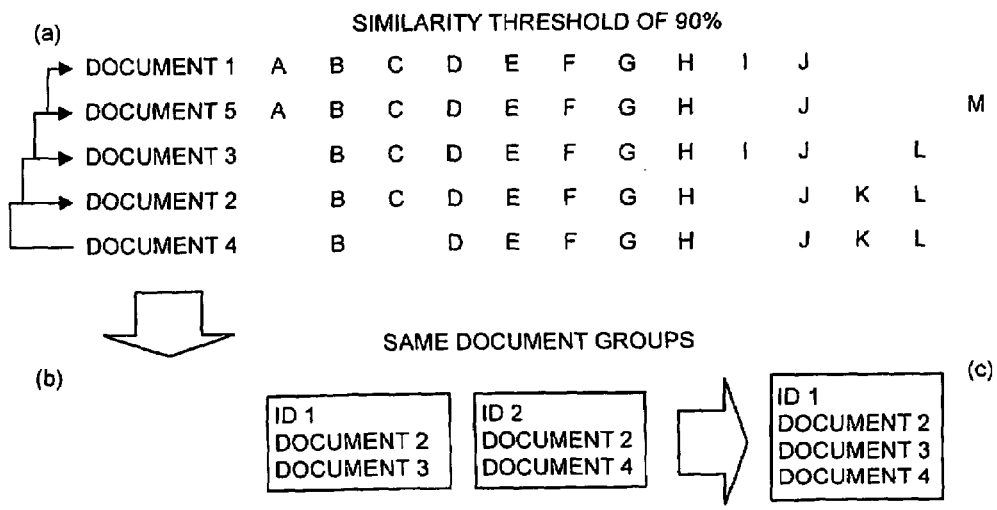
FIG. 2 A diagram for explaining a conventional technique described in the BACKGROUND section.

1 Data processing apparatus
2 Storage device
3 Object database
4 Input device
5 Output database
10 Document analyzing means
11 Same document candidate group creating means
12 Same document group creating means
20 Word group storage section
21 Priority storage section
22 Same document candidate group storage section

BEST MODES FOR CARRYING OUT THE INVENTION

An overview of the present invention will be first described with reference to an example shown in FIG. 3.

While the following description will be made exemplifying documents as an example of information and characters as an example of an information element, the present invention is not limited thereto. For instance, other examples of information may include images, sound or the like, and other examples of an information element constituting the information may include a specific pattern in an image, a specific segmental sound or the like.

The following description will be made on a case in which a set of documents (referred to as document pair hereinbelow) having a similarity NOT equal to or greater than 90% are found from documents 1-5 shown in FIG. 3.

In the present invention, first, priorities of characters present in common in the five documents are determined. For example, as shown in FIG. 3(d), the priority is determined so that a character with a smaller number of documents where it appears in the entire group of documents is given a higher priority. When the number of documents where a character appears is the same for different characters, the priority is determined so that a character appearing earlier in alphabetical order is given a higher priority.

Next, in order for the document pair to have a similarity of at least 90%, a rate of characters present in common between documents is calculated, and a number of characters to be selected from one document is determined based on the rate.

In order for a document pair to have a similarity of at least 90%, 90% or more of characters should be present in common between documents in the document pair. This means that a similarity equal to or greater than 90% is achieved only when at least nine characters are present in common between the documents in the document pair.

In other words, if neither of two characters selected from document x is contained in document y, the documents x and y have eight common words or less, resulting in a similarity lower than 90%, which is inconsistent with the provision that the similarity of documents x and y should be equal to or greater than 90%. This also applies when document y is exchanged with document x. Therefore, the number of characters to be selected from one document is two. While the number of characters to be selected from one document is two for any document in this example because the documents 1-5 are each composed of ten characters, the number of characters to be selected is one, for example, when a document is composed of five characters.

Subsequently, two characters are selected from each document based on the priority. In the example shown in FIG. 3(a), characters selected in document 1 are A and I, characters selected in document 2 are K and L, characters selected in document 3 are I and L, characters selected in document 4 are K and L, and characters selected in document 5 are A and M.

Then, a document pair having no common selected character between documents is found. In the example shown in FIG. 3(a), the document pair of documents 1 and 2 has no common character, the document pair of documents 1 and 3 has I in common, the document pair of documents 1 and 4 has no common character, and the document pair of documents 1 and 5 has A in common. Similarly, the document pair of documents 2 and 3 has L in common, the document pair of documents 2 and 4 has K and L in common, and the document pair of documents 2 and 5 has no common character. The document pair of documents 3 and 4 has L in common, and the document pair of documents 3 and 5 has no common character. The document pair of documents 4 and 5 has no common character. Therefore, document pairs having no common character are five pairs: the document pair of documents 1 and 2, document pair of documents 1 and 4, document pair of documents 2 and 5, document pair of documents 3 and 5, and document pair of documents 4 and 5. These five document pairs have a similarity not equal to or greater than 90%.

The reason of this is as follows: if a similarity between document x and document y is equal to or greater than 90%, and the priorities of characters to be selected are uniquely defined for all documents, at least one of two characters selected from document x (document y) according to priority should be contained in two characters selected from document y (document x).

If one or both of two characters {x1, x2} selected from document x is contained in document y and the character is not contained in two characters {y1, y2} selected from document y, the priorities of the characters in document y are {y1, y2}>{x1, x2}. Then, {x1, x2} n {y1, y2}=Φ, which means that one or both of the two characters {y1, y2} selected from document y is contained in document x but they are not contained in the two characters {x1, x2} selected from document x at the same time. At that time, the priorities of characters in document x are {x1, x2}>{y1, y2}. This means that the priorities of the selected characters are different between documents x and y, which is inconsistent with the provision that priorities of characters to be selected are uniquely defined among all documents. This also applies when document y is exchanged with document x.

Thus, according to the present invention, a document pair having a similarity not equal to or greater than a predetermined value can be found.

While the preceding description addresses a similarity with a threshold inclusively defined so that the similarity is not equal to or greater than the threshold, document pairs having a similarity not greater than a predetermined similarity threshold, exclusive of the predetermined similarity threshold itself, may be searched for depending upon a method of calculating the rate. Moreover, priorities of characters present in common among documents may be determined each time a different document group is subjected to search processing, or those determined once may be reused a number of times.

Furthermore, the present invention may also be applied to a system for determining a similarity of a document pair having a similarity equal to or greater than a predetermined similarity as in a document matching system, to reduce the number of operations in similarity calculation. For example, as in the example shown in FIG. 3, in determining a similarity of a document pair having a similarity equal to or greater than 90%, document pairs having a similarity not equal to or greater than 90% can be excluded in similarity calculation to thereby reduce the number of operations in similarity calculation. The example shown in FIG. 3(*a*) requires (5×4)/(2×1)=10 operations of similarity calculation when the present invention is not applied. However, five document pairs, the document pair of documents 1 and 2, document pair of documents 1 and 4, document pair of documents 2 and 5, document pair of documents 3 and 5, and document pair of documents 4 and 5 have a similarity not equal to or greater than 90%, and thus, they are excluded in similarity calculation, resulting in the number of operations in similarity calculation being 10−5=5.

Now the preceding description will be further generalized hereinbelow.

1. A case in which a document is considered as a set of words

Definition of Symbols

The following symbols are defined:

A set of documents contained in a database: $D=\{di|0<=i<=|D|\}$,

A set of words contained in a database: $T=\{tl|0<=l<=|T|\}$,

A number of different words contained in di: $|di|$,

A set of words contained in di: $di=\{tl|0<=l<=|di|\}$,

A priority of tl: $Pr(tl)$,

An importance of tl: $w(tl)$, $\#Pr(tl)$ may be determined from the magnitude of $w(tl)$.

A similarity between di and dj: $sim(di,dj)$, and

A similarity threshold: ST.

Theorem 1-1:

A symbol sdi is defined by:

$$sdi \subset di\{sdi \cap \forall dk[sim(di,dk)>=ST]\neq \Phi \wedge \overline{Pr(\forall tl \epsilon sdi)>Pr(\forall tl \epsilon -sdi)}\}$$

(where −sdi is a complementary set of sdi).

At that time, if Pr is uniquely determined by D and sdi and sdj are determined, then, $$sdi \cap sdj \neq \Phi$$

holds when $sim(di,dj)>=ST$.

Proof:

First, by definition of sdi and sdj, $$sdi \cap dj \neq \Phi \text{ and}$$

$$sdj \cap di \neq \Phi$$

hold when $sim(di,dj)>=ST$.

Now assuming that:

$$sdi \cap dj \neq \Phi \wedge sdi \cap sdj = \Phi,$$

then, an importance of a word in dj is represented by:

$$Pr(\forall tl \epsilon sdj)>Pr(\forall tl \epsilon sdi).$$

At that time, since $sdi \cap sdj = \Phi$, $$sdj \cap di \neq \Phi \wedge sdj \cap sdi = \Phi$$

holds at the same time.

Therefore, the importance of a word in di is represented by $Pr(\forall tl \epsilon sdi)>Pr(\forall tl \epsilon sdj)$.

This is inconsistent with the provision that Pr is uniquely determined by D.

This also applies when i is exchanged with j.

Therefore, Theorem 1-1 is validated.

Next, an idea that sdi can be determined before determining $$sim(\cup di \epsilon D, \forall dj \epsilon D)$$

will be demonstrated.

Theorem 1-2:

When a cosine similarity defined by $$sim(di,dj)=(\Sigma tl \epsilon di \cap dj\ w(tl)^2)/((\sqrt{\Sigma tl \epsilon di\ w(tl)^2})*\sqrt{(\Sigma tl \epsilon dj\ w(tl)}\sqrt{2}))$$

is used, if a definition is made as:

$$sdi \epsilon di\{(\Sigma tl \epsilon sdi lw(tl)^2)/(\Sigma tl \epsilon di\ w(tl)^2)>1-ST^2 \wedge Pr(\forall tl \epsilon sdi)>Pr(\forall tl \epsilon -sdi)\},$$

then, $$sdi \cap \forall dk[sim(di,dk)>=ST]\neq \Phi \wedge Pr(\forall tl \epsilon sdi)>Pr(\forall tl \epsilon -sdi)$$

holds.

Proof:

First, an idea that if $$sim(di,dj)>=ST,$$

then, $$(\Sigma tl \epsilon di \cap di\ w(ti)^2)/(\Sigma tl \epsilon di\ w(tl)^2)>=ST^2$$

holds will be proved.

Since $$\Sigma tl \epsilon dj\ w(tl)^2)>=(\Sigma tl \epsilon di \cap dj\ w(tl)^2),$$

$$ST<=sim(di,dj)=(\Sigma ti \epsilon di \cap di\ w(ti)^2)/((\sqrt{\Sigma tl \epsilon di w(tl)^2})*(\sqrt{\Sigma tl \epsilon dj\ w(tl)^2}))<=(\Sigma ti \epsilon dj\ w(ti)^2)/((\sqrt{\Sigma tl \epsilon di\ w(tl)^2})*(\sqrt{\Sigma tl \epsilon dj w(tl)^2}))=(\sqrt{\Sigma tl \epsilon di \cap dj}\ w(tl)^2)/(\sqrt{\Sigma tl \epsilon =di\ w(tl)^2}).$$

Therefore, $$(\Sigma tl \epsilon di \cap dj\ w(tl)^2)/(\Sigma tl \epsilon di\ w(tl)^2)>=ST^2.$$

Next, it is assumed that if a definition is made as:

$$sdi \epsilon di\{(\Sigma l=1 \ldots |sdi|w(tl)^2)/(\Sigma tl \epsilon di\ w(tl)^2)\}>1-ST^2,$$

then, $$sdi \cap \exists dk[sim(di,dk)>=ST]=\Phi$$

holds.

Since $$sim(d_i,d_k)>=ST,$$

$$(\Sigma t_l \in d_i \cap d_k w(t_l)^2)/(\Sigma t_l \in d_i\ w(t_l)^2)>=ST^2$$

holds from the above, and since $$(\Sigma t_l \in sd_i\ w(t_l)^2)/(\Sigma t_l \in d_i\ w(t_l)^2)>1-ST^2,$$

the two formulae are added to result in $$((\Sigma t_i \in d_i \cap d_k\ w(t_l)^2)+(\Sigma t_l \in sd_i\ w(t_l)^2))/(\Sigma t_l \in d_i\ w(t_l)^2)>1$$

$$((\Sigma t_i \in d_i \cap d_k\ w(t_l)^2)+(\Sigma t_l \in sd_i\ w(t_l)^2))>(\Sigma t_l \in d_i\ w(t_l)^2).$$

Since $$sd_i \cap d_k = \Phi,$$

$$(\Sigma t_i \in (d_i \cap d_k) \cup sd_i\ w(t_l)^2)>(\Sigma t_l \in d_i\ w(t_l)^2)$$

is obtained, but since $$(d_i \cap d_k) \cup sd_i \subseteq d_i,$$

this does not hold and is inconsistent.
Therefore, if a definition is made as:

$$sd_i = sd_i \in d_i\{(\Sigma t_l \in sd_i\ w(t_l)^2)/(\Sigma t_l \in d_i\ w(t_l)^2)\}>1-ST^2,$$

$$sd_i \cap \forall d_k[sim(d_i,d_k)>=ST]=\Phi$$

holds.
Since the above formula holds from whichever word the selection in $sd_i$ is started, Theorem 1-2 is validated.

2. A case in which a document is considered as a set of characters

Definition of Symbols:
A set of documents contained in a database: $D=\{d_i|0<=i<=|D|\}$
A set of characters contained in a database: $T=\{t_l|0<=l<=|T|\}$
A number of different characters contained in $d_i$: $|d_i|$,
A set of characters contained in $d_i$: $d_i=\{t_l|0<=l<=|d_i|\}$,
An appearance frequency of $t_l$ in $d_i$: $fq(d_i,t_l)$
A number of characters contained in $d_i$: $fq(d_i)$
A priority of $t_l$: $Pr(t_l)$,
An importance of $t_l$: $w(t_l)\#Pr(t_l)$ may be determined from the magnitude of $w(t_l)$.
A similarity between $d_i$ and $d_j$: $sim(d_i,d_j)$, and
A similarity threshold: ST.
Theorem 2-1:
A symbol $sd_i$ is defined by:

$$sd_i \subseteq d_i\{sd_i \cap \forall d_k[sim(d_i,d_k)>=ST]\Omega\Phi \wedge \overline{Pr(\forall t_l \in sd_i)>Pr(\forall t_l \in -sd_i)}\}.$$

At that time,
if Pr is uniquely determined by D, and
$sd_i$ and $sd_j$ are determined, $$sd_i \cap sd_j \neq \Phi$$

holds when $$sim(d_i,d_j)>=ST.$$

Proof:
The proof is similar to that for Theorem 1-1.
Theorem 2-2:
When a function defined by $$sim(d_i,d_j)=(fq(d_i)+fq(d_j)-\text{edit\_dis}(d_i,d_j))/(fq(d_i)+fq(d_j))$$

is used, if a definition is made as:

$$sd_i=sd_i \in d_i\{(\Sigma l=1 \ldots |sd_i|fq(d_i,t_l))/fq(d_i)>1-(ST/(2-ST)) \wedge Pr(\forall t_l \in sd_i)>Pr(\forall t_l \in -sd_i)\},$$

then, $$sd_i \cap \forall d_k[sim(d_i,d_k)>=ST]\neq\Phi \wedge Pr(\forall t_l \in sd_i)>Pr(\forall t_l \in -sd_i)$$

holds.

In addition, the symbol $\text{edit\_dis}(d_i,d_j)$ designates an edit distance between $d_i$ and $d_j$.
The edit distance between $d_i$ and $d_j$ refers to a minimal number of operations of insertion or deletion required for converting $d_i$ into $d_j$ or $d_j$ into $d_i$, and a smaller distance means a higher similarity of two documents.
Proof:
First, an idea that if $$sim(d_i,d_j)>=ST,$$

then, $$(\Sigma t_l \in d_i \cap d_j\ fq(d_i,t_l))/fq(d_i)>=ST/(2-ST)$$

holds will be proved.
Since $$\text{edit\_dis}(d_i,d_j)>=fq(d_i)+fq(d_j)-2\times(\Sigma t_l \in d_i \cap d_j \min(fq(d_i,t_l),fq(d_j,t_l))),$$

$$ST<=sim(d_i,d_j)=(fq(d_i)+fq(d_j)-\text{edit\_dis}(d_i,d_j))/(fq(d_i)+fq(d_j))<=2\times(\Sigma t_l \in d_i \cap d_j \min(fq(d_i,t_l),fq(d_j,t_l)))/(fq(d_i)+fq(d_j)).$$

Moreover, since $$fq(d_j)>=(\Sigma t_l \in d_i \cap d_i \min(fq(d_i,t_l),fq(d_j,t_l))),$$

$$ST<=2\times(\Sigma t_l \in d_i \cap d_j \min(fq(d_i,t_l),fq(d_j,t_l)))/(fq(d_i)+(\Sigma t_l \in d_i \cap d_j \min(fq(d_i,t_l),fq(d_j,t_l)))).$$

Therefore, $$(\Sigma t_l \in d_i \cap d_j \min(fq(d_i,t_l),fq(d_j,t_l)))/fq(d_i)>=ST/(2-ST).$$

Here, since $$fq(d_i,t_l)>=\min(fq(d_i,t_l),fq(d_j,t_l)),$$

$$(\Sigma t_l \in d_i \cap d_j\ fq(d_i,t_l))/fq(d_i)>=ST/(2-ST).$$

Next, it is assumed that if a definition is made as:

$$sd_i \in d_i\{(\Sigma t_l \in sd_i\ fq(d_i,t_l))/fq(d_i)\}>1-(ST/(2-ST))\},$$

then, $$sd_i \cap \exists d_k[sim(d_i,d_k)>=ST]=\Phi$$

holds.
Since $$sim(d_i,d_k)>=ST,$$

$$\Sigma t_l \in d_i \cap d_k\ fq(d_i,t_l)/fq(d_i)>=ST/(2-ST)$$

holds from the above, and since $$sd_i \cap d_i\{(\Sigma t_l \in sd_i\ fq(d_i,t_l))/fq(d_i)\}>1-(ST/(2-ST))\},$$

$$(\Sigma t_l \in d_i \cap d_k\ fq(d_i,t_l))/fq(d_i)+(\Sigma t_l \in sd_i\ fq(d_i,t_l))/fq(d_i)>1$$

$$(\Sigma t_l \in d_i \cap d_k\ fq(d_i,t_l))+(\Sigma t_l \in sd_i\ fq(d_i,t_l))>fq(d_i)$$

holds.

Since $$sdi \cap dk = \Phi,$$

$$(\Sigma tl \in (di \cap dk) \cup sdi \, fq(di,tl)) > fq(di)$$

holds, but since $$(di \cap dk) \cup sdi \subseteq di,$$

this does not hold and is inconsistent.
Therefore, if a definition is made as:

$$sdi = sdi \in di \{ (\Sigma tl \in sdi \, fq(di,tl))/fq(di) \} > 1 - (ST/(2-ST)) \}$$

$$sdi \cap \forall dk[sim(di,dk)>=ST] \neq \Phi$$

holds.
Since the above formula holds from whichever character the selection in sdi is started, Theorem 2-2 is validated.

Next, the best mode for carrying out the present invention will be described in detail with reference to the accompanying drawings.

It should be noted that the description of embodiments will be made on a document matching system, which is a representative example for information matching. Moreover, since the configuration of the same document matching system is different between a case in which a document is treated as a set of words and a case in which a document is treated as a set of characters in the embodiments, the first embodiment addresses a system for a case in which a document is treated as a set of words, and the second embodiment addresses a system for a case in which a document is treated as a set of characters.

First Embodiment

A first embodiment of the present invention will be described.

Figure 4:
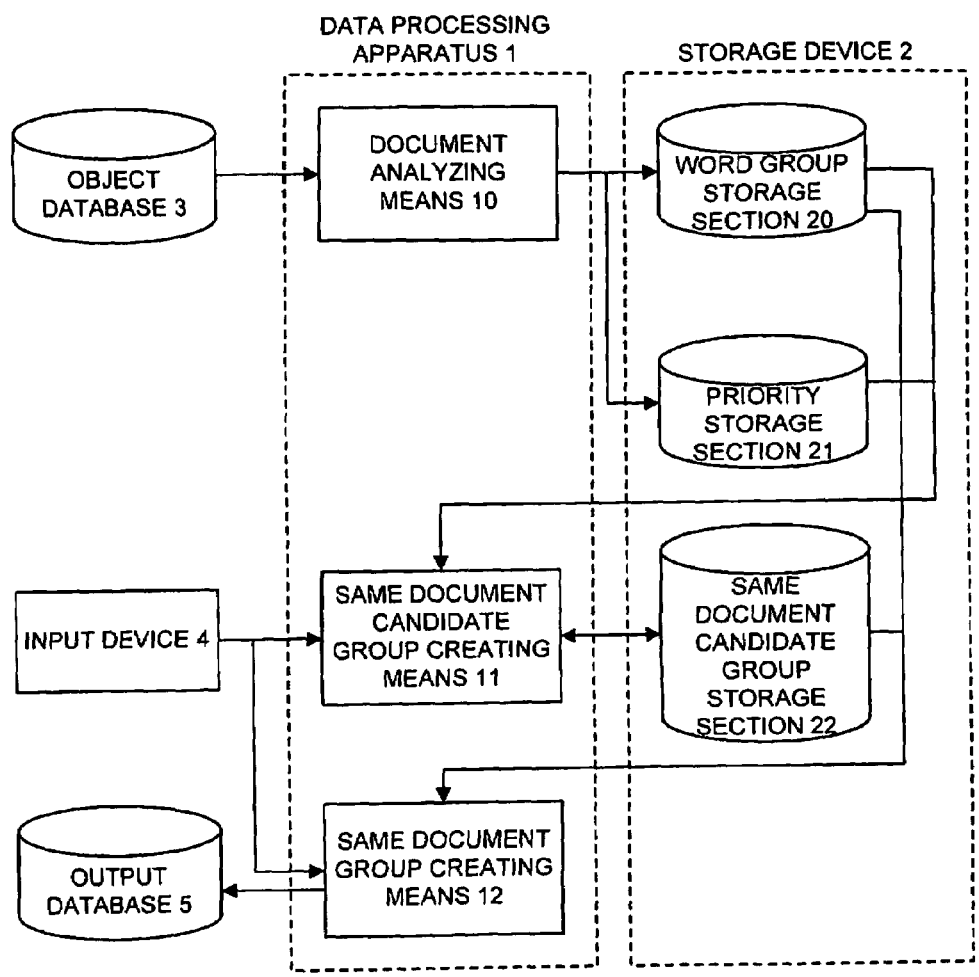
FIG. 4 A block diagram showing a configuration of a first embodiment of the present invention.

A same document matching system in accordance with the first embodiment includes, as shown in FIG. 4, a data processing apparatus 1 operating under program control, a storage device 2 for storing information, an object database 3, an input device 4 such as a keyboard, and an output database 5. The storage device 2 is a non-transitory media.

The object database 3 is a so-called database, in which a plurality of documents are stored. It may be a single database or a virtually merged one composed of a plurality of databases.

The input device 4 is for a user of the same document matching system to input a similarity threshold. If the similarity of a pair of two documents is equal to or greater than the similarity threshold, they are regarded as same documents.

The data processing apparatus 1 includes document analyzing means 10, same document candidate group creating means 11, and same document group creating means 12.

The document analyzing means 10 extracts a group of words contained in each document stored in the object database 3 and stores them into a word group storage section 20, and moreover, it determines priorities of all words present in the object database 3 for use in common among all documents and stores them in a priority storage section 21. For convenience of understanding, the description is made on the document analyzing means 10 provided for determining priorities; however, in a case that priorities used in the past are reused (that is, priorities are already stored in the priority storage section 21), the function of the document analyzing means 10 for determining priorities is unnecessary.

The same document candidate group creating means 11 selects a group of words of a kind such that at least one word is necessarily present in common between documents having a similarity equal to or greater than the similarity threshold input via the input device 4, from the groups of words contained in the documents and stored in the word group storage section 20, with priorities for use in common among all documents to be subjected to same document matching and stored in the priority storage section 21, and then, adds the document to a same document candidate group with an ID of each selected word, referring to the same document candidate group storage section 22.

The same document group creating means 12 calculates a similarity of a document pair that belongs to an identical same document candidate group stored in the same document candidate group storage section 22 referring to the word group storage section 20, decides a pair of documents having a similarity equal to or greater than the similarity threshold input via the input device 4 as members of a same document group, or decides a group of documents in which document pairs having a similarity equal to or greater than the similarity threshold and containing common documents are combined, as members of a same document group, and stores the result into the object database 3.

The storage device 2 includes a word group storage section 20, a priority storage section 21, and a same document candidate group storage section 22. While the storage device 2 is desirably contained in a memory for the sake of speedup of the processing, it may be a magnetic storage medium such as HDD.

The word group storage section 20 stores therein correspondence between a document and a group of words contained in the document.

The priority storage section 21 stores therein correspondence between a word and its priority.

The same document candidate group storage section 22 stores therein correspondence between a same document candidate group and a document.

The output database 5 stores therein correspondence between a document and a same document group.

Next, referring to FIG. 5, an operation of the first embodiment will be described in detail. It should be noted that the following description will be made on a similarity threshold input via the input device 4 of 75%.

First, the document analyzing means 10 extracts a group of words contained in each document stored in the object database 3 and stores them into the word group storage section 20, and moreover, it determines priorities of all words present in the object database 3 for use in common among all documents and stores them in the priority storage section 21 (Step S1). For convenience of understanding, the description is made on the step of determining priorities in the process of same document group creation processing; however, priorities used in the same document group creation processing in the past may be reused, and in this case, the step of determining priorities is unnecessary.

The group of words extracted from a document are cut out from the document by applying morphological analysis to the document. Only those among the cut-out words representing specific word classes, for example, nouns, adjective verbs, adjectives, verbs, and unknown words, may be used in the group of words. For example, for a document "search by information search," {information, search} constitute a group of words. Since the appearance frequency of a word in a document is not used in the subsequent processing, only one of the same words appearing in one document may be incorporated in the group of words.

Morphological analysis is required when the present invention is applied to languages having no delimiter between words in documents, such as Japanese and Chinese. On the other hand, morphological analysis is not necessarily required in languages having delimiters between words in documents, such as English, Korean, German, French and Spanish.

Figures 5, 6:
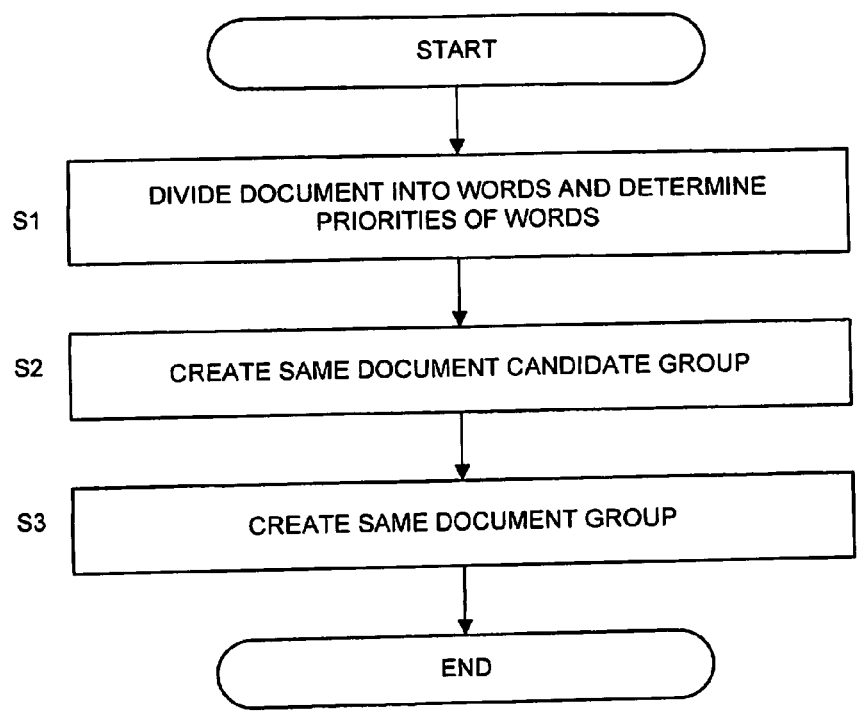
FIG. 5 A flow chart showing an operation of the first embodiment of the present invention.
FIG. 6 A diagram showing an example of storage in a word storage section 20 in the first embodiment and in an object database 3 in a second embodiment of the present invention.

FIG. 6 shows an example of storage in the word group storage section 20. For convenience of explanation of the operation, a word is symbolized by an alphabetical characters, and the words are aligned according to the alphabetical characters here.

The priorities of words may be determined based on any criterion without affecting practice of the present invention insofar as they are unique. However, in a case that a word with a smaller number of documents where it appears is given a higher priority, the number of documents entered into a same document candidate group by the same document candidate group creating means 11 can be reduced, and accordingly, the number of operations in similarity calculation can be reduced at the same document group creating means 12.

FIG. 7 shows an example of storage in the priority storage section 21. The priority storage section 21 stores therein correspondence between a word, a number of documents where it appears, and a priority. The priority of a word is higher for a word with a smaller number of documents where it appears, and for words with the same number of documents where they appear, a word having a lower character code number, i.e., a word appearing earlier in alphabetical order is given a higher priority.

Next, the same document candidate group creating means 11 selects a group of words of a kind such that at least one word is necessarily present in common between documents having a similarity equal to or greater than the similarity threshold input via the input device 4, from the groups of words contained in the documents and stored in the word group storage section 20, with priorities for use in common among all documents to be subjected to same document matching and stored in the priority storage section 21, and then, adds the document to a same document candidate group with an ID of each selected word, referring to the same document candidate group storage section 22 (Step S2).

Figure 8:
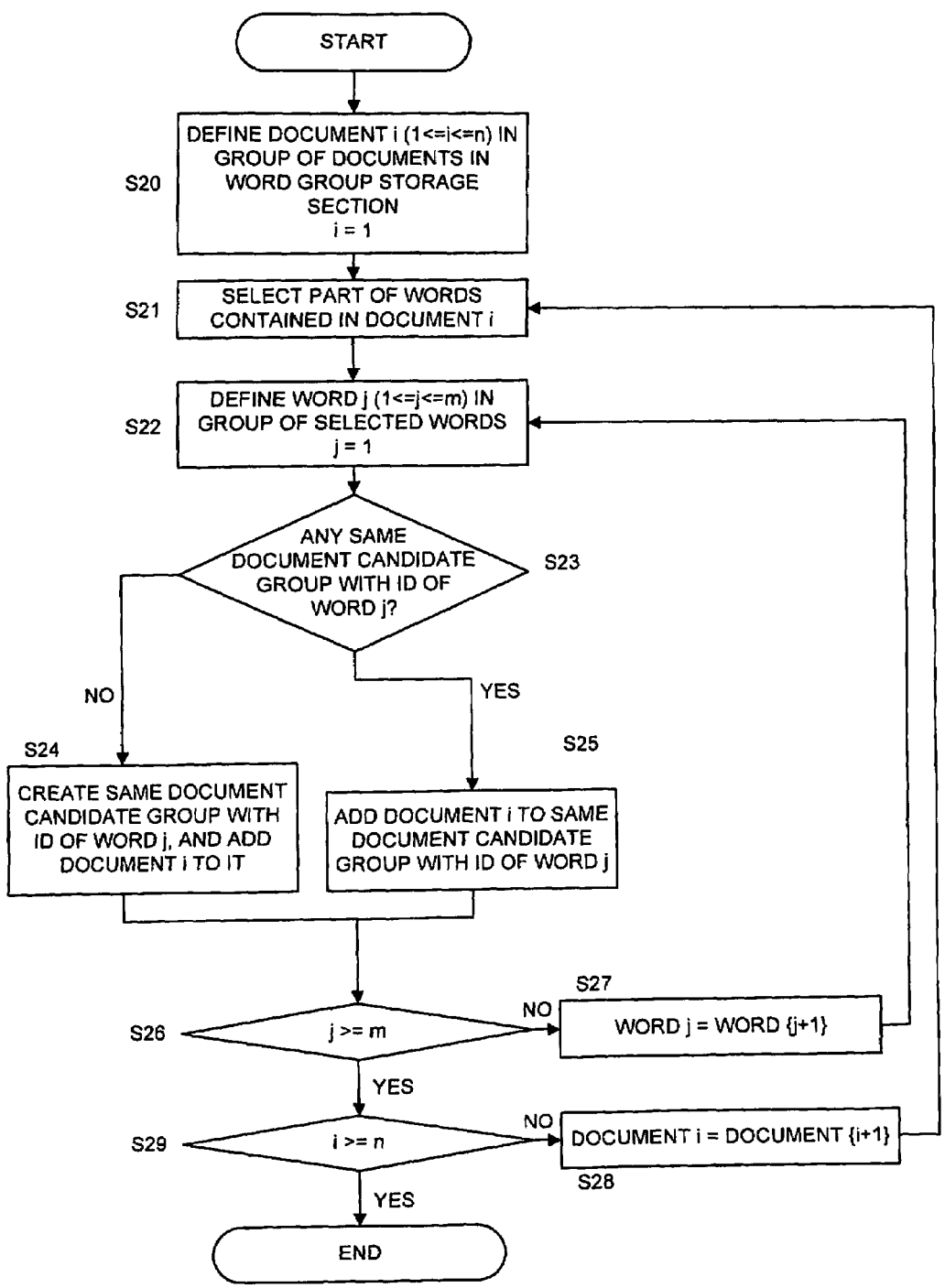
FIG. 8 A flow chart showing an operation of same document candidate group creating means 11 in the first embodiment of the present invention.

Now the operation of Step S2 will be described in detail with reference to FIG. 8.

First, a document having a first document ID stored in the word group storage section 20 is selected (Step S20). The order of selecting documents is irrelevant to practice of the present invention and may be arbitrary. For convenience of explanation, the description here will address a case in which the documents are given ID's from document 1 to document n, an i-th document is designated as document i, and document i=document 1 is selected at Step S20.

Next, a group of words of a kind such that at least one word is necessarily present in common between documents having a similarity equal to or greater than the similarity threshold input via the input device 4 is selected from among the words contained in document i, with priorities for use in common among all documents to be subjected to same document matching and stored in the priority storage section 21 (Step S21). The description here will be made on a case in which the similarity is calculated by the cosine similarity in Theorem 1-2.

A method of determining a weight w(tl) for a word contained in document i does not affect practice of the present invention. For example, weights for words may be all the same, such as w(tl)=1, or they may be defined so that a higher importance is given to a word with a smaller number of documents where it appears, such as w(tl)=log 2{(total number of documents)/(number of documents where tl appears)}. The description here will be made on w(tl)=1. It should be noted that when calculation is made with w(tl)=log 2{(total number of documents)/(number of documents where tl appears)}, the number of documents where tl appears may be obtained from the priority storage section 21.

A group of words to be selected from document i follows Theorem 1-2. For example, since the similarity threshold input via the input device 4 is 75%, the number of words to be selected from document 1 in the word group storage section 20 in FIG. 6 may be a minimal number of different words that satisfy (number of different words to be selected)/9>1−0.75^2, which is four, according to Theorem 1-2. Likewise, the number of words to be selected from document 2 may be a minimal number of different words that satisfy (number of different words to be selected)/5>1−0.75^2, which is two three, according to Theorem 1-2. The number of words to be selected from document 3 may be a minimal number of different words that satisfy (number of different words to be selected)/7>1−0.75^2, which is four, according to Theorem 1-2. The number of words to be selected from document 4 may be a minimal number of different words that satisfy (number of different words to be selected)/6>1−0.75^2, which is three, according to Theorem 1-2. The number of words to be selected from document 5 may be a minimal number of different words that satisfy (number of different words to be selected)/7>1−0.75^2, which is four, according to Theorem 1-2. The number of words to be selected from document 6 may be a minimal number of different words that satisfy (number of different words to be selected)/2>1−0.75^2, which is one, according to Theorem 1-2.

The order of words to be selected from document i follows the priorities stored in the priority storage section 21. Four words to be selected from document 1 are {A, I, B, C}.

Next, a word having a first word ID in the group of words selected at Step S21 is selected (Step S22). The order of selecting words is irrelevant to practice of the present invention and may be arbitrary. For convenience of explanation, the description here will address a case in which the words are given ID's from word 1 to word m, a j-th word is designated as word j, and word j=word 1 is selected first at Step S22.

Next, the same document candidate group storage section 22 is referred to as to whether a same document candidate group with an ID of word j is present (Step S23). If no such a group is present, a same document candidate group with an ID of word j is newly created, and document is added thereto (Step S24). If the group is present, document i is added to the same document candidate group with an ID of word j (Step S25).

Next, decision is made as to whether the word ID at Step S22 satisfies j>=m (Step S26), and if it is satisfied, the flow goes to Step S29; otherwise, word j=word {j+1} is redefined (Step S27) and the flow goes back to Step S22.

Next, decision is made as to whether the document ID at Step S21 satisfies i>=n (Step S29), and if it is satisfied, the flow goes to Step S3; otherwise, document i=document {i+1} is redefined (Step S28) and the flow goes back to Step S21.

The preceding description has been made on the operation of the same document candidate group creating means 11 at Step S2.

When the similarity threshold is 75%, the same document candidate group creating means 11 selects {A, I, B, C} from document 1 in the word group storage section 20 in FIG. 6, {G, L, E} from document 2, {I, B, C, D} from document 3, {G, K, L} from document 4, {A, M, B, C} from document 5, and {K} from document 6, and stores them in the same document candidate group storage section 22 as shown in FIG. 9.

Referring again to in FIG. 5, at Step S3, the same document group creating means 12 refers to the same document candidate group storage section 22, calculates a similarity of a document pair that belongs to an identical same document candidate group referring to the word group storage section 20, decides a pair of documents having a similarity equal to or greater than the similarity threshold input via the input device 4 as members of a same document group, or decides a group of documents in which document pairs having a similarity equal to or greater than the similarity threshold and containing common documents are combined, as members of a same document group, and stores the result into the object database 3 (Step S3).

Figure 10:
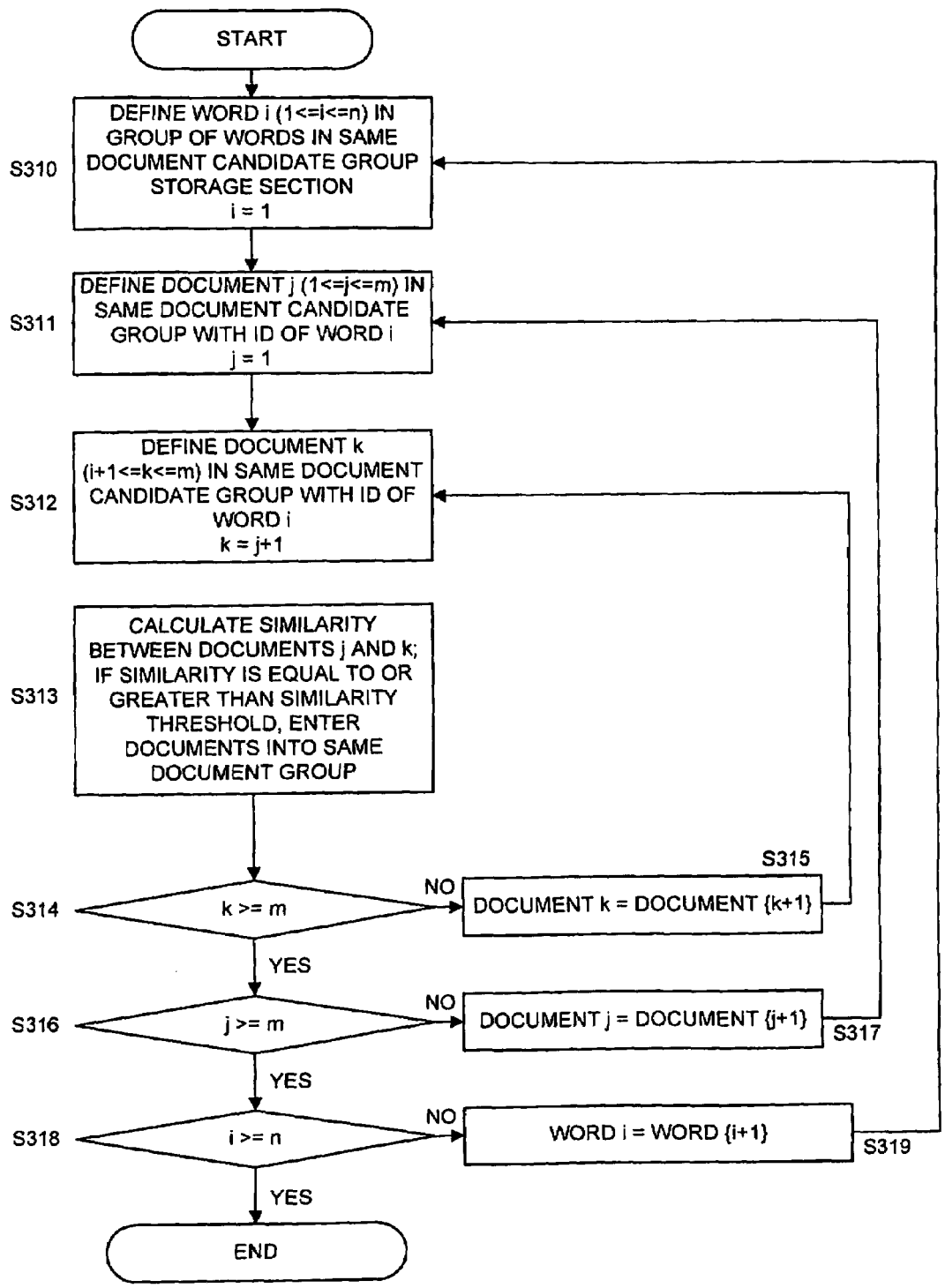
FIG. 10 A flow chart showing an operation of a first same document group creating means 12 in the first embodiment of the present invention.

Now the operation of the same document group creating means 12 (Step S3) will be described in detail. It should be noted that the operation of Step S3 may be achieved by two methods, one of which will be described first with reference to FIG. 10.

First, a word having a first word ID stored in the same document candidate group storage section 22 is selected (Step S310). The order of selecting words is irrelevant to practice of the present invention and may be arbitrary. For convenience of explanation, the description here will address a case in which the words are given ID's from word 1 to word n, an i-th word is designated as word i, and word i=word 1 is selected at Step S310.

Next, a document having a first document ID is selected from the same document candidate group with an ID of word i (Step S311). The order of selecting documents is irrelevant to practice of the present invention and may be arbitrary. For convenience of explanation, the description here will address a case in which documents in the same document candidate group with an ID of word i are given ID's from document 1 to document m, a j-th document is designated as document j, and document j=document 1 is selected at Step S311.

Next, a document having a document ID of document k=document j+1 is selected from the same document candidate group with an ID of word i (Step S312).

Next, a similarity is determined between documents j and k referring to the word group storage section 20, and if the similarity is equal to or greater than the similarity threshold input via the input device 4, the documents are entered into the output database 5 as members of a same document group (Step S313). The formula for calculating a similarity that is employed is similar to that for the same document candidate group creating means 11 at Step S2. For example, document 1 and document 5 in the same document candidate group storage section 22 with an ID of word A entered as members of a same document group as shown in FIG. 9 are subjected to similarity calculation using a cosine similarity according to Theorem 2 with a weight for the words of $w(tl)=1$, which results in cosine (document 1, document 5)=$6/\sqrt{9} \times \sqrt{7}=0.76$, and since the similarity threshold is 75%, they are entered into the output database 5 as members of a same document group.

Next, decision is made as to whether the document ID at Step S312 satisfies k>=m (Step S314), and if it is satisfied, the flow goes to Step S316; otherwise, document k=document {k+1} is redefined (Step S315) and the flow goes back to Step S312.

Next, decision is made as to whether the document ID at Step S311 satisfies j>=m (Step S316), and if it is satisfied, the flow goes to Step S318; otherwise, document j=document {j+1} is redefined (Step S317) and the flow goes back to Step S311.

Next, decision is made as to whether the word ID at Step S310 satisfies i>=n (Step S318), and if it is satisfied, the processing is terminated; otherwise, word i=word {i+1} is redefined (Step S319) and the flow goes back to Step S310.

The preceding description has been made on the operation of first same document group creating means 12 at Step S3. When the similarity threshold is 75%, the same document group creating means 12 calculates the similarity eleven times in total: that is, for a same document candidate group with an ID of word A in the same document candidate group storage section 22 as shown in FIG. 9, {document 1, document 5}; for a group with an ID of word B, {document 1, document 3}, {document 1, document 5} and {document 3, document 5}; for a group with an ID of word C, {document 1, document 3}, {document 1, document 5} and {document 3, document 5}; for a group with an ID of word G, {document 2, document 4}; for a group with an ID of word I, {document 1, document 3}; for a group with an ID of word K, {document 4, document 6}; and for a group with an ID of word L, {document 2, document 4} (see FIG. 11 for the results of the similarity calculation), and outputs the same document groups to the output database 5 as shown in FIG. 12.

Thus, while the round-robin method disclosed in Non-patent Document 1 requires 6×5/2=15 operations of similarity calculation for the word group storage section 20 in FIG. 6, the present invention can output the equivalent result by eleven operations of the calculation. While the description of the same document group creating means 12 at Step S3 employs a simple method that applies similarity calculation to the same document pair several times, it is possible to keep document pairs whose similarity has been already calculated in the storage device 2 so that only one operation of calculation may be applied to the same document pair. For example, {document 1, document 5} is subjected to calculation three times: that is, for the group of word A, the group of word B and the group of word C; however, when a similarity is calculated for any one of the groups, no more calculation is required for other groups. In this case, the same document group creating means 12 at Step S3 is required to perform similarity calculation only five times for the same document candidate group storage section 22 in FIG. 9.

Possible methods of storing the same document groups into the output database 5 are shown in FIG. 12(a), (b) and (c). In (a), document pairs having a similarity equal to or greater than the similarity threshold are stored as same document groups. Each record represents one same document group. In (b), a group of documents in which document pairs having a similarity equal to or greater than the similarity threshold and containing common documents are combined is stored as a same document group. A value of a field in the first column represents one same document group. In (c), a group of documents having a similarity equal to or greater than the threshold with a certain document are stored as a same document group for that document. A document ID in the first column represents a same document group for that document ID. For example, for document 1, document 3 and document 5 are entered as same document groups; for document 2, document 4 is entered as a same document group.

Figure 14:
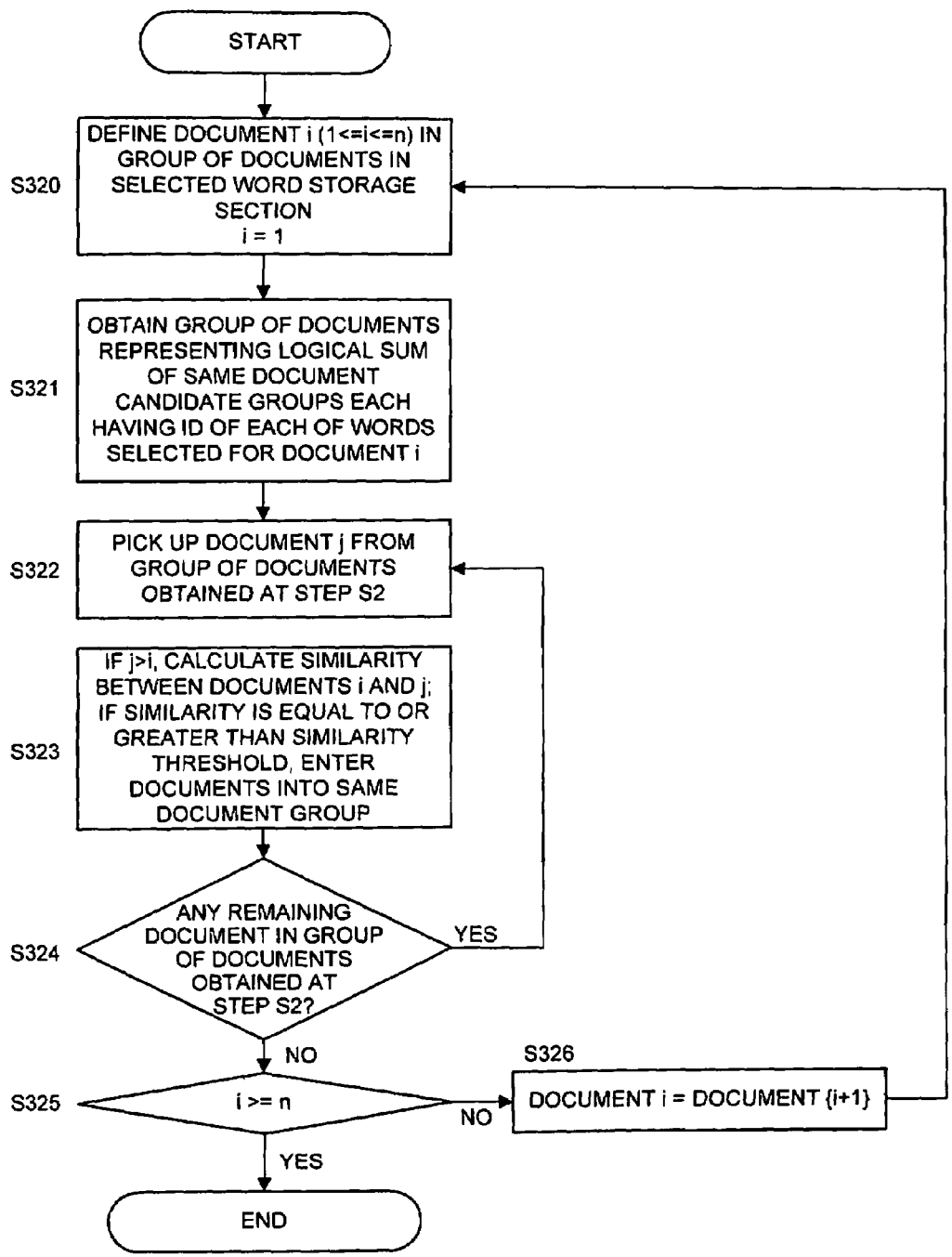
FIG. 14 A flow chart showing an operation of a second same document candidate group creating means 12 in the first embodiment of the present invention.

Subsequently, an operation of second same document group creating means 12 (Step S3) will be described in detail with reference to FIG. 14. To achieve the operation of the second, it is necessary to output correspondence between a document and a group of selected words to a selected word storage section by the same document candidate group creating means 11 at Step S2. An example of the selected word storage section is shown in FIG. 13.

First, a document having a first document ID stored in the selected word storage section is selected (Step S320). The order of selecting documents is irrelevant to practice of the present invention and may be arbitrary. For convenience of explanation, the description here will address a case in which the documents are given ID's from document 1 to document n, an i-th document is designated as document i, and document i=document 1 is selected at Step S320.

Next, referring to the same document candidate group storage section 22, a group of documents representing a logical sum of same document candidate groups each having an ID of each of the words selected for document i is obtained (Step S321). For example, for document i=document 1, selected words for document 1 are {A, B, C, I} referring to FIG. 13. With reference to FIG. 9, the groups of documents in the same document candidate groups each having an ID of each of the selected words are: for word A, {document 1, document 5}; for word B, {document 1, document 3, document 5}; for word C, {document 1, document 3, document 5}; and for word I, {document 1, document 3}. A group of the documents representing their logical sum include {document 1, document 3, document 5}.

Next, document j is picked up from the group of documents as obtained at Step S321 (Step S322). The order of picking up documents is irrelevant to practice of the present invention and may be arbitrary.

Next, if j>i, a similarity between document i and document j is calculated, and if the similarity is equal to or greater than the similarity threshold, the documents are entered into the output database 5 as members of a same document group (Step S323). For example, for document i=document 1, a group of words representing the logical sum includes {document 1, document 3, document 5} at Step S322, and a similarity is calculated only when document j=document 3 and document j=document 5. The formula for calculating a similarity that is employed is the same as that in the same document candidate group creating means 11 at Step S2, and further description will be omitted because this is a similar operation to that of the first same document group creating means 12.

Next, if there still remains any more group of words representing the logical sum obtained at Step S322, the flow goes back to Step S322; otherwise, goes to Step S325 (Step S324).

Next, decision is made as to whether the document ID at Step S320 satisfies i>=n (Step S325), and if it is satisfied, the processing is terminated, otherwise, document i=document {i+1} is redefined (Step S326) and the flow goes back to Step S320.

The preceding description has been made on the operation of the second same document group creating means 12 at Step S3. When the similarity threshold is 75%, the group of words representing a logical sum for document 1 includes {document 1, document 3, document 5}, the group of words representing a logical sum for document 2 includes {document 2, document 4}, the group of words representing a logical sum for document 3 includes {document 1, document 3, document 5}, the group of words representing a logical sum for document 4 includes {document 2, document 4, document 6}, the group of words representing a logical sum for document 5 includes {document 1, document 3, document 5}, and the group of words representing a logical sum for document 6 includes {document 4, document 6}; the similarity is calculated five times in total, that is, calculated for {document 1, document 3}, {document 1, document 5}, {document 2, document 4}, {document 3, document 5}, and {document 4, document 6}, and same document groups are output to the output database 5 as shown in FIG. 12.

Thus, while the round-robin method disclosed in Non-patent Document 1 requires 6×5/2=15 operations of similarity calculation for the word group storage section 20 in FIG. 6, the present invention can output the equivalent result by five operations of the calculation.

As described above, according to the present invention, it is possible to achieve matching of same documents eliminating the need of advance specification of the number of groups, with an exact solution without any omission in matching, and capable of operating at a high speed even for a larger number of groups.

The reason of the high speed is that document pairs to be subjected to similarity calculation are limited to those belonging to the identical same document candidate group. The reason of the exact solution without any omission in matching is that a kind of words such that at least one word is necessarily present in common between documents having a similarity equal to or greater than a similarity threshold, are selected from among words contained in a document for use in document group creation. The reason that the need of advance specification of the number of same document groups is eliminated and matching is achieved at a high speed for a large number of same document groups is that it is possible to create a same document group even when the number of same document groups is not given in advance.

Moreover, in assigning priorities applied in common in selecting words, a higher priority is given to a word with a smaller number of documents where it appears, whereby a larger number of document pairs having a similarity not equal to or greater than a similarity threshold can be found. As a result, the number of documents entered into a same document candidate group by the same document candidate group creating means 11 can be reduced, and thus, the number of operations in similarity calculation can be reduced at the same document group creating means 12.

Second Embodiment

Now a second embodiment will be described.

Figure 15:
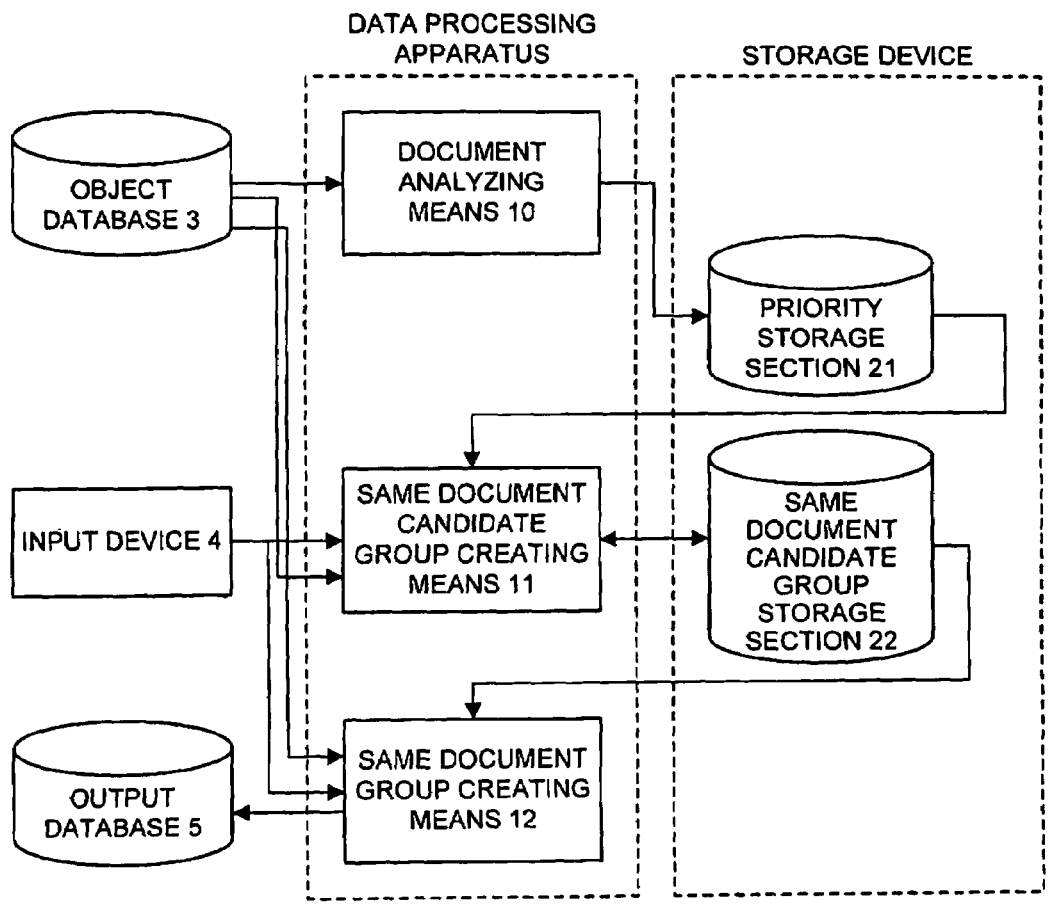
FIG. 15 A block diagram showing a configuration of the second embodiment of the present invention.

Referring to FIG. 15, a same document matching system in accordance with the second embodiment includes a data processing apparatus 1 operating under program control, a storage device 2 for storing information, an object database 3, an input device 4 such as a keyboard, and an output database 5.

The object database 3 is similar to that in the first embodiment.

The input device 4 is similar to that in the first embodiment.

The data processing apparatus 1 has document analyzing means 10, same document candidate group creating means 11, and same document group creating means 12.

The document analyzing means 10 determines priorities of all characters present in the object database 3 for use in common among all documents and stores them in a priority storage section 21. For convenience of understanding, similarly to the first embodiment, the following description will be made on the document analyzing means 10 provided for determining priorities; however, in a case that priorities used in the past are reused (that is, priorities are already stored in the priority storage section 21), the function of the document analyzing means 10 for determining priorities is unnecessary.

The same document candidate group creating means 11 selects a group of characters in a number such that at least one character is necessarily present in common between documents having a similarity equal to or greater than the similarity threshold input via the input device 4, from the group of characters contained in the documents and stored in the object database 3, with priorities for use in common among all documents to be subjected to same document matching and stored in the priority storage section 21, and then, adds the document to a same document candidate group with an ID of each selected character, referring to the same document candidate group storage section 22.

The same document group creating means 12 calculates a similarity of a document pair that belongs to the identical same document candidate group stored in the same document candidate group storage section 22 referring to the object database 3, decides a pair of documents having a similarity equal to or greater than the similarity threshold input via the input device 4 as members of a same document group, or decides a group of documents in which document pairs having a similarity equal to or greater than the similarity threshold and containing common documents are combined, as members of a same document group, and stores the result into the object database 3.

The storage device 2 includes a priority storage section 21 and a same document candidate group storage section 22. While the storage device 2 is desirably contained in a memory for the sake of speedup of the processing, it may be a magnetic storage medium such as HDD.

The priority storage section 21 is similar to that in the first embodiment. The same document candidate group storage section 22 is similar to that in the first embodiment. The output database 5 is similar to that in the first embodiment.

Figure 16:
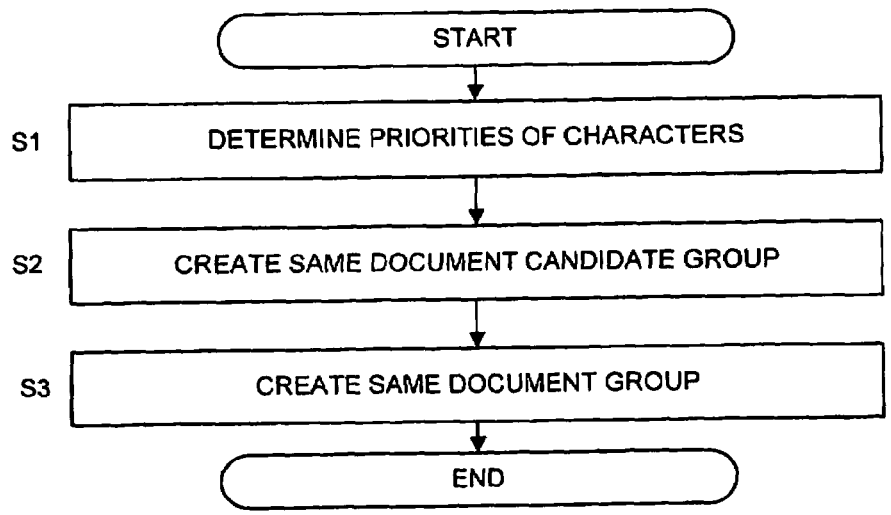
FIG. 16 A flow chart showing an operation of the second embodiment of the present invention.

Next, referring to FIG. 16, an operation in the best mode for carrying out the present invention will be described in detail. It should be noted that the following description will be made on a similarity threshold input via the input device 4 of 75%.

First, the document analyzing means 10 determines priorities of all characters present in the object database 3 for use in common among all documents and stores them in the priority storage section 21 (Step S1). For convenience of understanding, similarly to the first embodiment, the description is made on the priorities determined in the process of same document group creation processing; however, priorities used in the same document group creation processing in the past may be reused, and in this case, the step of determining priorities is unnecessary.

The priorities of characters may be determined based on any criterion without affecting practice of the present invention insofar as they are unique. However, in a case that a character with a smaller number of documents where it appears is given a higher priority, the number of documents entered into a same document candidate group by the same document candidate group creating means 11 can be reduced, and accordingly, the number of operations in similarity calculation can be reduced at the same document group creating means 12.

FIG. 7 shows an example of storage in the priority storage section 21 obtained by referring to the object database 3 in FIG. 6. The priority storage section 21 here stores therein correspondence between a character, a number of documents where it appears, and a priority. The priority of a character is higher for a character with a smaller number of documents where it appears, and for characters with the same number of documents where they appear, a character having a lower character code number, i.e., a character appearing earlier in alphabetical order is given a higher priority.

Subsequently, the same document candidate group creating means 11 selects a group of characters in a number such that at least one character is necessarily present in common between documents having a similarity equal to or greater than the similarity threshold input via the input device 4, from among the groups of characters contained in the documents and stored in the object database 3, with priorities for use in common among all documents to be subjected to same document matching and stored in the priority storage section 21, and then, adds the document to a same document candidate group with an ID of each selected character, referring to the same document candidate group storage section 22 (Step S2).

Now the operation of the same document candidate group creating means 11 (Step S2) will be described in detail with reference to FIG. 17.

First, a document having a first document ID stored in the object database 3 is selected (Step S20). The order of selecting documents is irrelevant to practice of the present invention and may be arbitrary. For convenience of explanation, the description here will address a case in which the documents are given ID's from document 1 to document n, an i-th document is designated as document i, and document i=document 1 is selected at Step S20.

Next, a group of characters in a number such that at least one character is necessarily present in common between documents having a similarity equal to or greater than the similarity threshold input via the input device 4 is selected from among the characters contained in document i, with priorities for use in common among all documents to be subjected to same document matching and stored in the object database 3 (Step S21). The description here will be made on a case in which the similarity is calculated by the similarity in Theorem 2-2.

The number of characters to be selected from document follows Theorem 2-2. For example, since the similarity threshold input via the input device 4 is 75%, the number of characters to be selected from document 1 in the object database 3 in FIG. 6 may be a minimal number of characters to be selected that satisfy (number of characters to be selected)/$9 > 1 - 0.75/(2 - 0.75)$, which is four, according to Theorem 2-2. Likewise, the number of characters to be selected from document 2 may be a minimal number of characters to be selected that satisfy (number of characters to be selected)/$5 > 1 - 0.75/(2 - 0.75)$, which is three, according to Theorem 2-2. The number of characters to be selected from document 3 may be a minimal number of characters to be selected that satisfy (number of characters to be selected)/$7 > 1 - 0.75/(2 - 0.75)$, which is three, according to Theorem 2-2. The number of characters to be selected from document 4 may be a minimal number of characters to be selected that satisfy (number of characters to be selected)/$6 > 1 - 0.75/(2 - 0.75)$, which is three, according to Theorem 2-2. The number of characters to be selected from document 5 may be a minimal number of characters to be selected that satisfy (number of characters to be selected)/$7 > 1 - 0.75/(2 - 0.75)$, which is three, according to Theorem 2-2. The number of characters to be selected from document 6 may be a minimal number of characters to be selected that satisfy (number of characters to be selected)/$2 > 1 - 0.75/(2 - 0.75)$, which is one, according to Theorem 2-2.

The order of characters to be selected from document follows the priorities stored in the priority storage section 21. Four characters to be selected from document 1 are {A, I, B, C}.

Figure 17:
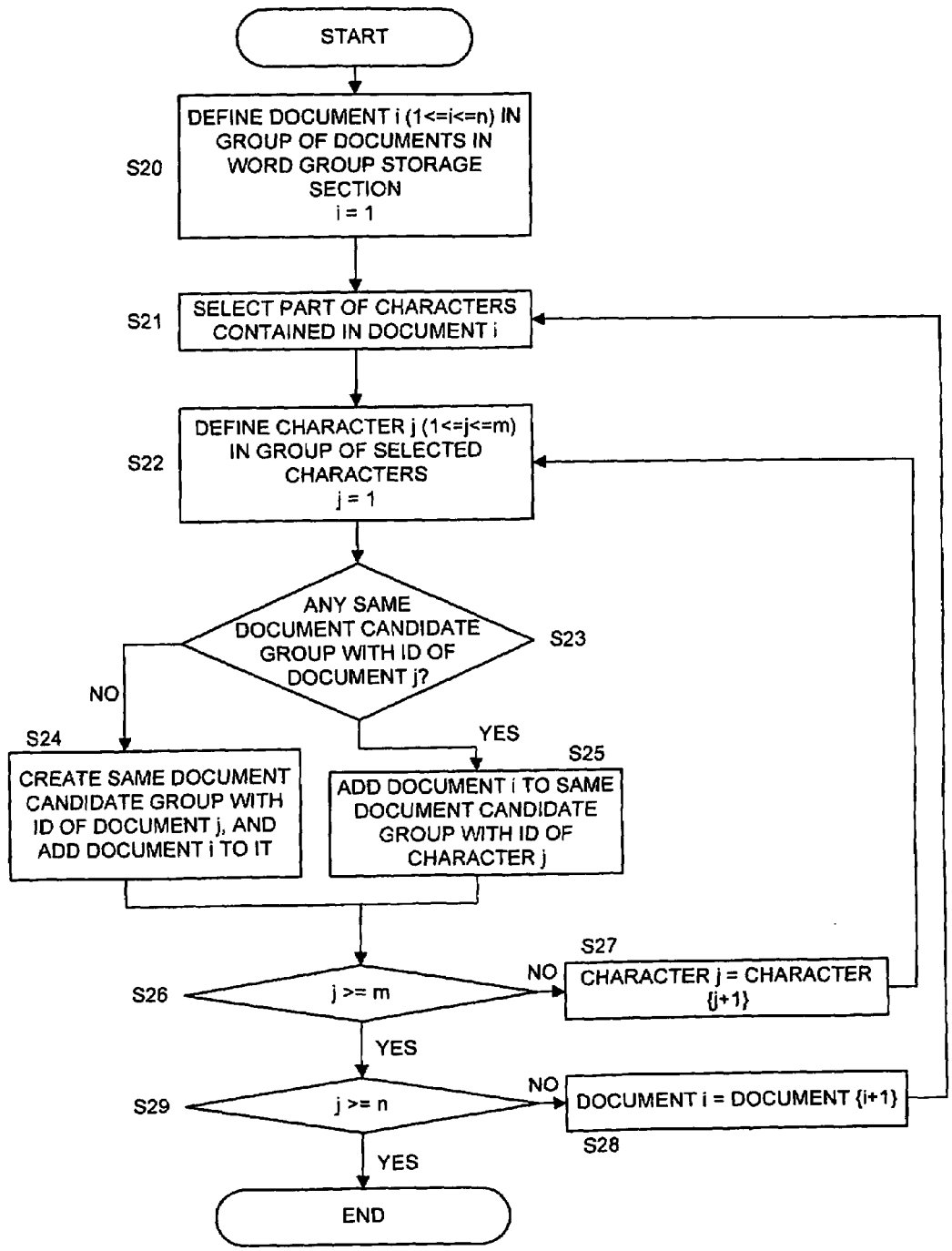
FIG. 17 A flow chart showing an operation of the same document candidate group creating means 11 in the second embodiment of the present invention.

Next, a character having a first character ID in the group of characters selected at Step S21 is selected (Step S22 in FIG. 17). The order of selecting characters is irrelevant to practice of the present invention and may be arbitrary. For convenience of explanation, the description here will address a case in which the characters are given ID's from character 1 to character m, a j-th character is designated as character j, and character j=character 1 is selected first at Step S22.

Next, the same document candidate group storage section 22 is referred to as to whether a same document candidate group with an ID of character j is present (Step S23). If no such a group is present, a same document candidate group with an ID of character j is newly created, and document i is added thereto (Step S24). If the group is present, document i is added to the same document candidate group with an ID of character j (Step S25 in FIG. 17).

Next, decision is made as to whether the character ID at Step S22 satisfies j>=m (Step S26), and if it is satisfied, the flow goes to Step S29; otherwise, character j=character {j+1} is redefined (Step S27) and the flow goes back to Step S22.

Next, decision is made as to whether the document ID at Step S22 satisfies i>=n (Step S29), and if it is satisfied, the flow goes to Step S3; otherwise, document i=document {i+1} is redefined (Step S28) and the flow goes back to Step S21.

The preceding description has been made on the same document candidate group creating means 11 at Step S2. When the similarity threshold is 75%, the same document candidate group creating means 11 selects {A, I, B, C} from document 1 in the object database 3 in FIG. 6, {G, L, E} from document 2, {I, B, C} from document 3, {G, K, L} from document 4, [A, M, B] from document 5, and {K} from document 6, and stores them in the same document candidate group storage section 22 as shown in FIG. 18.

The same document group creating means 12 refers to the same document candidate group storage section 22, calculates a similarity of a document pair that belongs to the identical same document candidate group referring to the object database 3, decides a pair of documents having a similarity equal to or greater than the similarity threshold input via the input device 4 as members of a same document group, or decides a group of documents in which document pairs having a similarity equal to or greater than the similarity threshold and containing common documents are combined, as members of a same document group, and stores the result into the object database 3 (Step S3).

Figure 19:
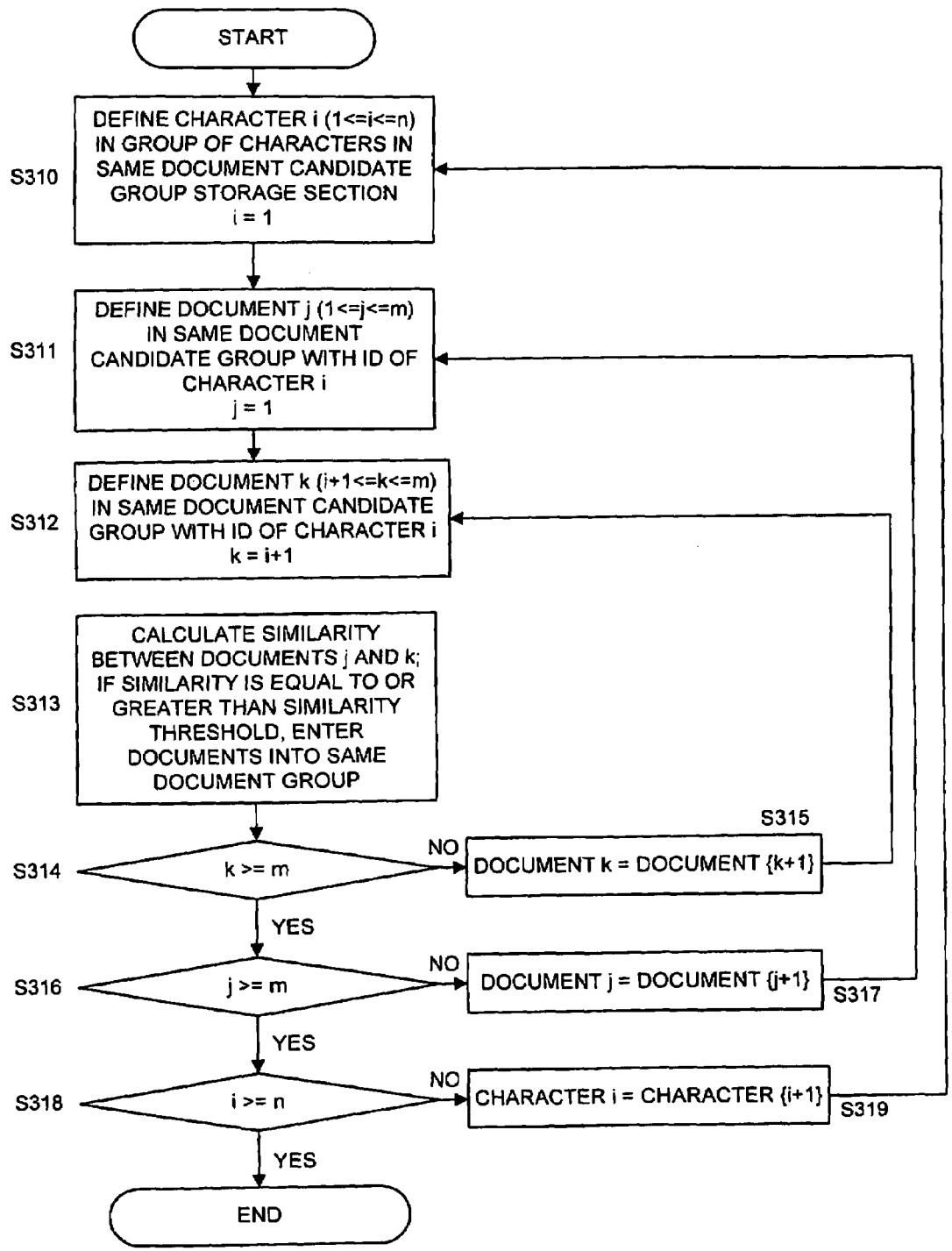
FIG. 19 A flow chart showing an operation of a first same document group creating means 12 in the second embodiment of the present invention.

Now the operation at Step S3 will be described in detail. It should be noted that the operation of Step S3 may be achieved by two methods, one of which will be described first with reference to FIG. 19.

First, a character having a first character ID stored in the same document candidate group storage section 22 is selected (Step S310). The order of selecting characters is irrelevant to practice of the present invention and may be arbitrary. For convenience of explanation, the description here will address a case in which the characters are given ID's from character 1 to character n, an i-th character is designated as character i, and character i=character 1 is selected at Step S310.

Next, a document having a first document ID is selected from the same document candidate group with an ID of character i (Step S311). The order of selecting documents is irrelevant to practice of the present invention and may be arbitrary. For convenience of explanation, the description here will address a case in which documents in the same document candidate group with an ID of character i are given ID's from document 1 to document m, a j-th document is designated as document j, and document j=document 1 is selected at Step S311.

Next, a document having a document ID of document k=document j+1 is selected from the same document candidate group with an ID of character i (Step S312).

Next, a similarity is determined between documents j and k referring to the object database 3, and if the similarity is equal to or greater than the similarity threshold input via the input device 4, the documents are entered into the output database 5 as members of a same document group (Step S313). The formula for calculating a similarity that is employed is similar to that for the same document candidate group creating means 11 at Step S2. For example, document 1 and document 5 in the same document candidate group storage section 22 with an ID of character A entered as members of a same document group as shown in FIG. 18 are subjected to similarity calculation using a similarity according to Theorem 2-2, which results in sim(document 1, document 5)=(9+7−4)/(9+7)=0.75, and since the similarity threshold is 75%, they are entered into the output database 5 as members of a same document group.

Next, decision is made as to whether the document ID at Step S312 satisfies k>=m (Step S314), and if it is satisfied, the flow goes to Step S316; otherwise, document k=document {k+1} is redefined (Step S315) and the flow goes back to Step S312.

Next, decision is made as to whether the document ID at Step S311 satisfies j>=m (Step S316), and if it is satisfied, the flow goes to Step S318; otherwise, document j=document {j+1} is redefined (Step S317) and the flow goes back to Step S311.

Next, decision is made as to whether the character ID at Step S satisfies i>=n (Step S318), and if it is satisfied, the processing is terminated; otherwise, character i=character {i+1} is redefined (Step S319) and the flow goes back to Step S310.

The preceding description has been made on the operation of the first same document group creating means 12 at Step S3. When the similarity threshold is 75%, the same document group creating means 12 calculates the similarity nine times in total: that is, for a same document candidate group with an ID of character A in the same document candidate group storage section 22 as shown in FIG. 18, {document 1, document 5}; for a group with an ID of character B, {document 1, document 3}, {document 1, document 5} and {document 3, document 5}; for a group with an ID of character C, {document 1, document 3}; for a group with an ID of character G, {document 2, document 4}; for a group with an ID of character I, {document 1, document 3}; for a group with an ID of character K, {document 4, document 6}; and for a group with an ID of character L, {document 2, document 4} (see FIG. 20 for the results of similarity calculation), and outputs the same document groups to the output database 5 as shown in FIG. 12.

Thus, while the round-robin method disclosed in Non-patent Document 1 requires 6×5/2=15 operations of similarity calculation for the object database 3 in FIG. 6, the present invention can output the equivalent result by nine operations of the calculation. While the description of the same document group creating means 12 at Step S2 employs a simple method that applies similarity calculation to the same document pair several times, it is possible to keep document pairs whose similarity has been already calculated in the storage device 2 so that only one operation of calculation may be applied to the same document pair. In this case, the same document group creating means 12 at Step S3 is required to perform similarity calculation only five times for the same document candidate group storage section 22 in FIG. 18.

Figure 22:
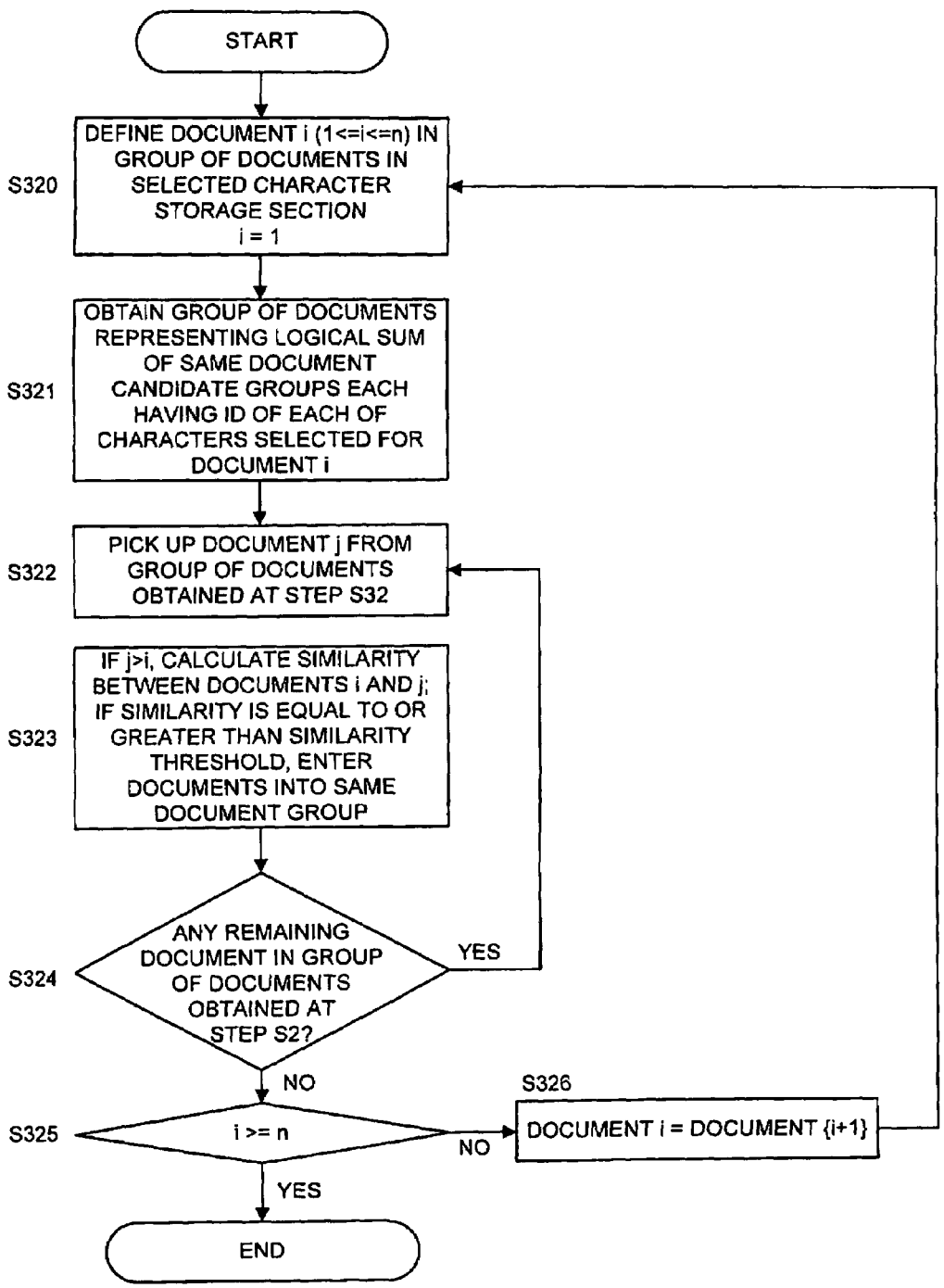
FIG. 22 A flow chart showing an operation of a second same document candidate group creating means 12 in the second embodiment of the present invention.

Subsequently, an operation of a second one at Step S3 will be described in detail with reference to FIG. 22.

To achieve the operation of the second, it is necessary to output correspondence between a document and a group of selected characters to a selected character storage section by the same document candidate group creating means 11 at Step S2. An example of the selected character storage section is shown in FIG. 21.

First, a document having a first document ID stored in the selected character storage section is selected (Step S320). The order of selecting documents is irrelevant to practice of the present invention and may be arbitrary. For convenience of explanation, the description here will address a case in which the documents are given ID's from character 1 to character n, an i-th character is designated as character i, and character i=character 1 is selected at Step S320.

Next, referring to the same document candidate group storage section 22, a group of documents representing a logical sum of same document candidate groups each having an ID of each of the characters selected for document i is obtained (Step S321). For example, for document i=document 1, selected characters for document 1 are {A, B, C, I} referring to FIG. 21. With reference to FIG. 18, the groups of documents in the same document candidate groups each having an ID of each of the selected words are: for character A, {document 1, document 5}; for character B {document 1, document 3, document 5}; for character C, {document 1, document 3}; and for character I, {document 1, document 3}. The group of the documents representing their logical sum include {document 1, document 3, document 5}.

Next, document j is picked up from the group of documents as obtained at Step S321 (Step S322). The order of picking up documents is irrelevant to practice of the present invention and may be arbitrary.

Next, if j>i, a similarity between document i and document j is calculated, and if the similarity is equal to or greater than the similarity threshold, the documents are entered into the output database 5 as members of a same document group (Step S323). For example, for document i=document 1, a group of characters representing the logical sum includes {document 1, document 3, document 5} at Step S321, and a similarity is calculated only when document j=document 3 and document j=document 5. The formula for calculating a similarity that is employed is the same as that in the same document candidate group creating means 11 at Step S2, and further description will be omitted because this is a similar operation to that of the first same document group creating means 12.

Next, if there still remains any more group of characters representing the logical sum obtained at Step S321, the flow goes back to Step S322; otherwise, goes to Step S325 (Step S324).

Next, decision is made as to whether the document ID at Step S320 satisfies i>=n (Step S325), and if it is satisfied, the processing is terminated, otherwise, document i=document {i+1} is redefined (Step S326) and the flow goes back to Step S320.

The preceding description has been made on the operation of the second same document group creating means 12 at Step S3. When the similarity threshold is 75%, the group of characters representing a logical sum for document 1 includes {document 1, document 3, document 5}, the group of characters representing a logical sum for document 2 includes {document 2, document 4}, the group of characters representing a logical sum for document 3 includes {document 1, document 3, document 5}, the group of characters representing a logical sum for document 4 includes {document 2, document 4, document 6}, the group of characters representing a logical sum for document 5 includes {document 1, document 3, document 5}, and the group of characters representing a logical sum for document 6 includes {document 4, document 6}; the similarity is calculated five times in total, that is, calculated for {document 1, document 3}, {document 1, document 5}, {document 2, document 4}, {document 3, document 5}, and {document 4, document 6}, and the same document groups are output to the output database 5 as shown in FIG. 12.

As described above, according to the present invention, it is possible to achieve matching of same documents eliminating the need of advance specification of the number of groups, with an exact solution without any omission in matching, and capable of operating at a high speed even for a larger number of groups.

The reason of the high speed is that document pairs to be subjected to similarity calculation are limited to those belonging to the identical same document candidate group. The reason of the exact solution without any omission in matching is that a number of characters such that at least one character is necessarily present in common between documents having a similarity equal to or greater than a similarity threshold, are selected from among characters contained in a document for use in document group creation. Moreover, the reason that the need of advance specification of the number of same document groups is eliminated and matching is achieved at a high speed for a large number of same document groups is that it is possible to create a same document group even when the number of same document groups is not given in advance.

Third Embodiment

Figure 23:
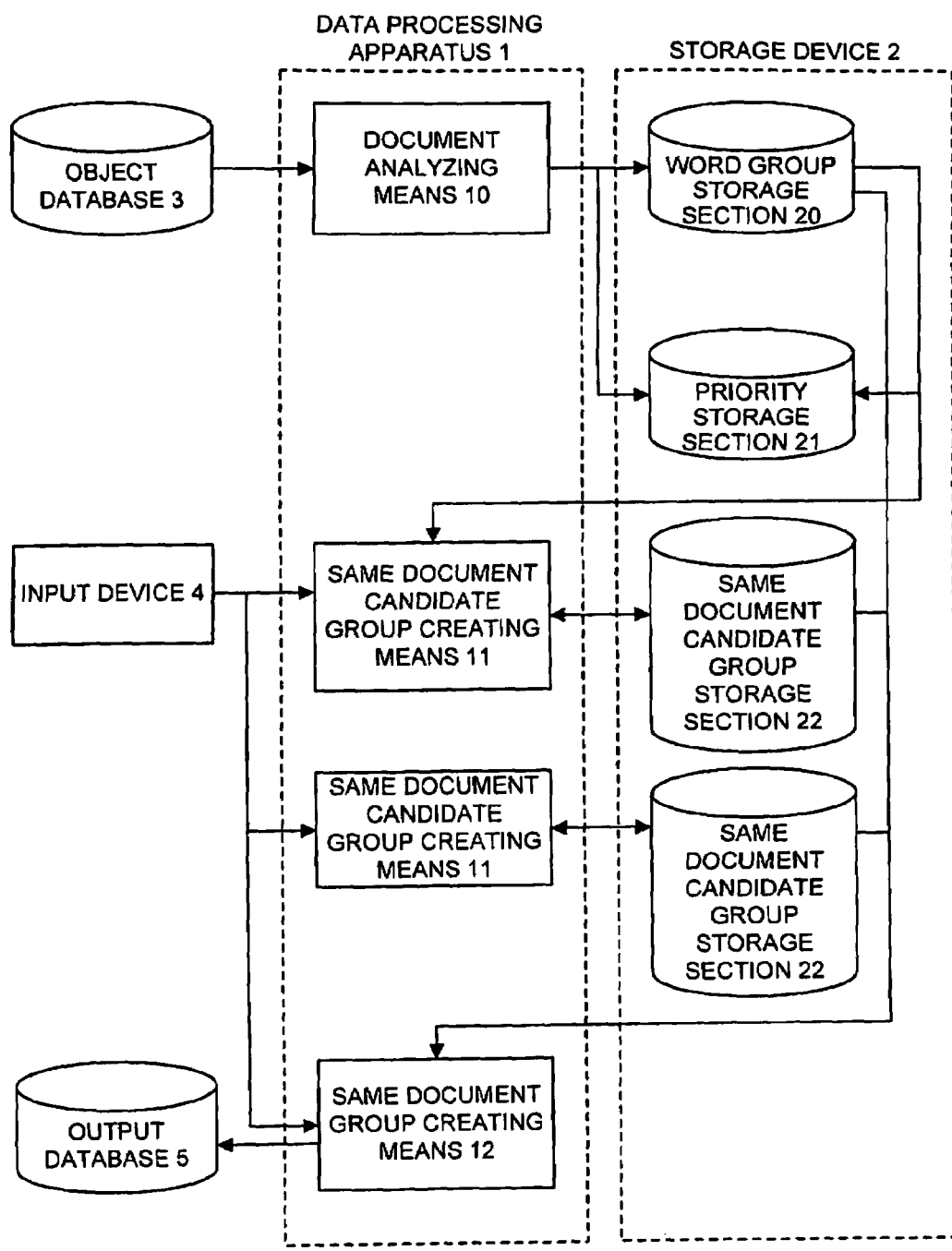
FIG. 23 A block diagram showing a configuration of a third embodiment of the present invention.

Referring to FIG. 23, a third embodiment of the present invention has a configuration generally similar to that of the first embodiment, except that a plurality of same document candidate group creating means 11 that define priorities of words with different criteria, and a plurality of corresponding same document candidate group storage sections 22 are employed, and that the same document group creating means 12 defines a pair of documents having a similarity equal to or greater than the similarity threshold as members of a same document group, or defines a group of documents in which document pairs having a similarity equal to or greater than the similarity threshold and containing common documents are combined, as members of a same document group, among document pairs belonging to the identical same document candidate group in any one of all of a plurality of the same document candidate group storage sections 22.

For the sake of simplifying explanation, FIG. 23 shows two sets of the same document candidate group creating means 11 and the following description of the operation will be made regarding such two sets of the means; however, the present invention is not necessarily limited thereto, and three or more sets of the same document candidate group creating means may be provided.

Figure 24:
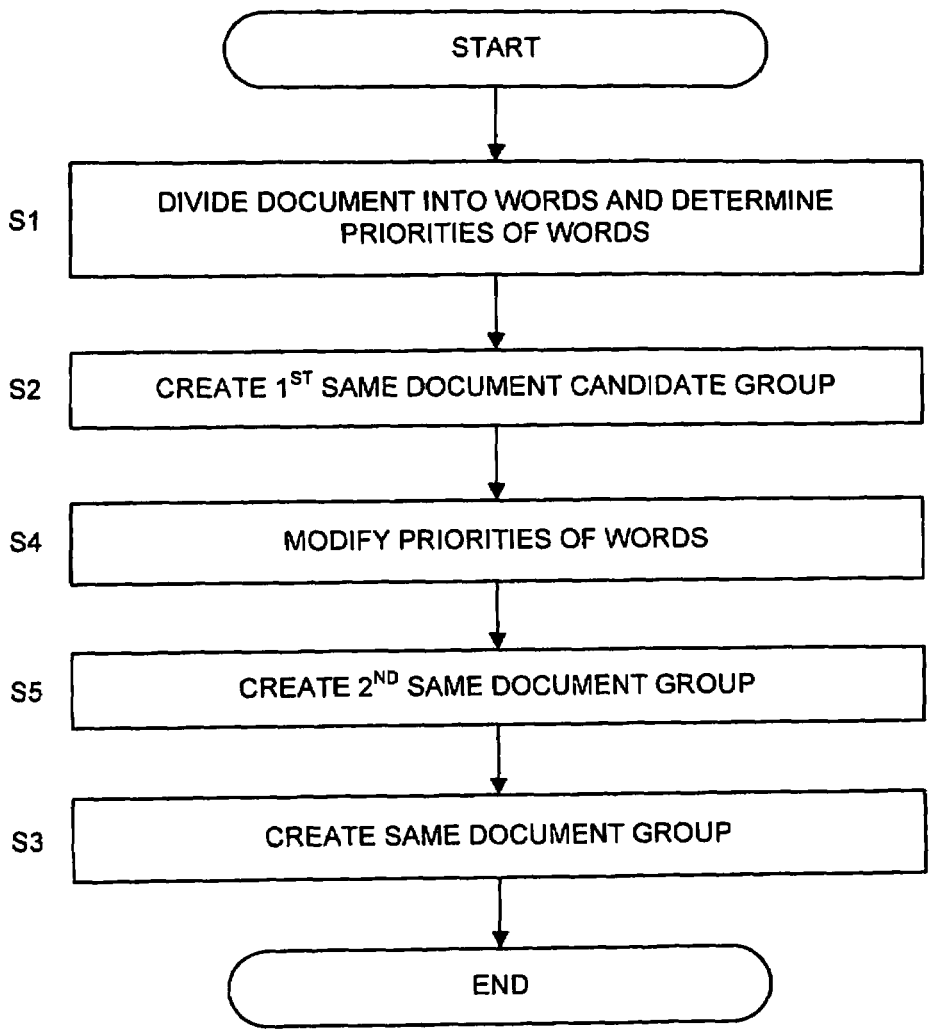
FIG. 24 A flow chart showing an operation of the third embodiment of the present invention.

Next, referring to FIG. 24, an operation in the best mode for carrying out the present invention will be described in detail. It should be noted that the following description will be made on a similarity threshold input via the input device 4 of 85%.

First, Step S1 represents an operation of the document analyzing means 10, which is similar to Step S1 in the first embodiment. The following description will be made on an exemplary case in which groups of words contained in documents 1-10 as shown in FIG. 25 are stored in the word group storage section 20. In this case, the priority of a word is higher for a word with a smaller number of documents where it appears, and for words with the same number of documents where they appear, a word having a lower character code number, i.e., a word appearing earlier in alphabetical order is given a higher priority, whereupon the words are stored in the priority storage section 21 with priorities as shown in FIG. 26. For convenience of understanding, similarly to the first embodiment, the following description will be made on the document analyzing means 10 provided for determining priorities; however, in a case that priorities used in the past are reused (that is, priorities are already stored in the priority storage section 21), the function of the document analyzing means 10 for determining priorities is unnecessary and the step of determining priorities is also unnecessary. Moreover, in this embodiment, while a plurality of sets of priorities are employed as will be described regarding Step S4, it is possible to implement a configuration in which only part of priorities are newly determined, and for the rest of the priorities, those determined in the past are reused rather than being newly determined.

Next, at Step S2, a first same document candidate group is created by the first same document candidate group creating means 11. This operation is similar to that at Step S2 in the first embodiment. The description will be made on a case in which the first same document candidate group creating means 11 is applied to the word group storage section 20 in the drawing with priorities in the priority storage section as shown in FIG. 26. Since the similarity threshold is 85%, a minimal number of different words that satisfy (number of different words to be selected)/(number of different words contained in a document)>$1-0.85^2$ are selected from each document according to Theorem 1-2. Underlined words are selected from each document as shown in FIG. 27, and are stored in the first same document candidate group storage section as shown in FIG. 28. At that time, correspondence between a document and a group of selected words is output to the first selected word storage section as shown in FIG. 29.

Next, at Step S4, priorities in the priority storage section 21 are modified using the first same document candidate group storage section 22. While a higher priority is given to a word with a smaller number of documents where it appears at Step S1, a higher priority is given to a word that has a smaller number of documents where it appears and that is less frequently selected at the first same document candidate group creating means 11 at Step S4. For example, a higher priority may be given when a sum of the number of documents where a certain word appears and the number of documents where the word is selected by the first same document candidate group creating means 11 is smaller. FIG. 30 shows an example of modifying the priorities in the priority storage section 21 using the first same document candidate group storage section shown in FIG. 28. For example, since the number of documents where word A appears is three and word A is selected three times in the first same document candidate group creating means 11, a sum of these two, that is, 6, is defined as score. In a case that scores are the same, a higher priority is given to a word appearing later in alphabetical order.

Next, at Step S5, a second same document candidate group is created by the second same document candidate group creating means 12. This operation is similar to that at Step S2 in the first embodiment. The description will be made on a case in which the second same document candidate group creating means is applied to the word group storage section 20 in FIG. 25 with priorities in the priority storage section as shown in FIG. 30. Since the similarity threshold is 85%, a minimal number of different words that satisfy (number of different words to be selected)/(number of different words contained in a document)>$1-0.85^2$ are selected from each document according to Theorem 2-2. Underlined words are selected from each document as shown in FIG. 31, and are stored in the second same document candidate group storage section as shown in FIG. 32. At that time, correspondence between a document and a group of selected words is output to the second selected word storage section as shown in FIG. 33.

Next, at Step S3, the same document group creating means 12 decides a pair of documents having a similarity equal to or greater than the similarity threshold as members of a same document group, or decides a group of documents in which document pairs having a similarity equal to or greater than the similarity threshold and containing common documents are combined, as members of a same document group, among document pairs belonging to the identical same document candidate group in any one of all of a plurality of the same document candidate group storage sections 22, and stores the result into the object database 3.

The operation of the same document group creating means 12 (Step S3) will be described.

The operation at Step S3 will be described in detail with reference to FIG. 34, focusing on a difference from the operation in the first embodiment.

Figure 34:
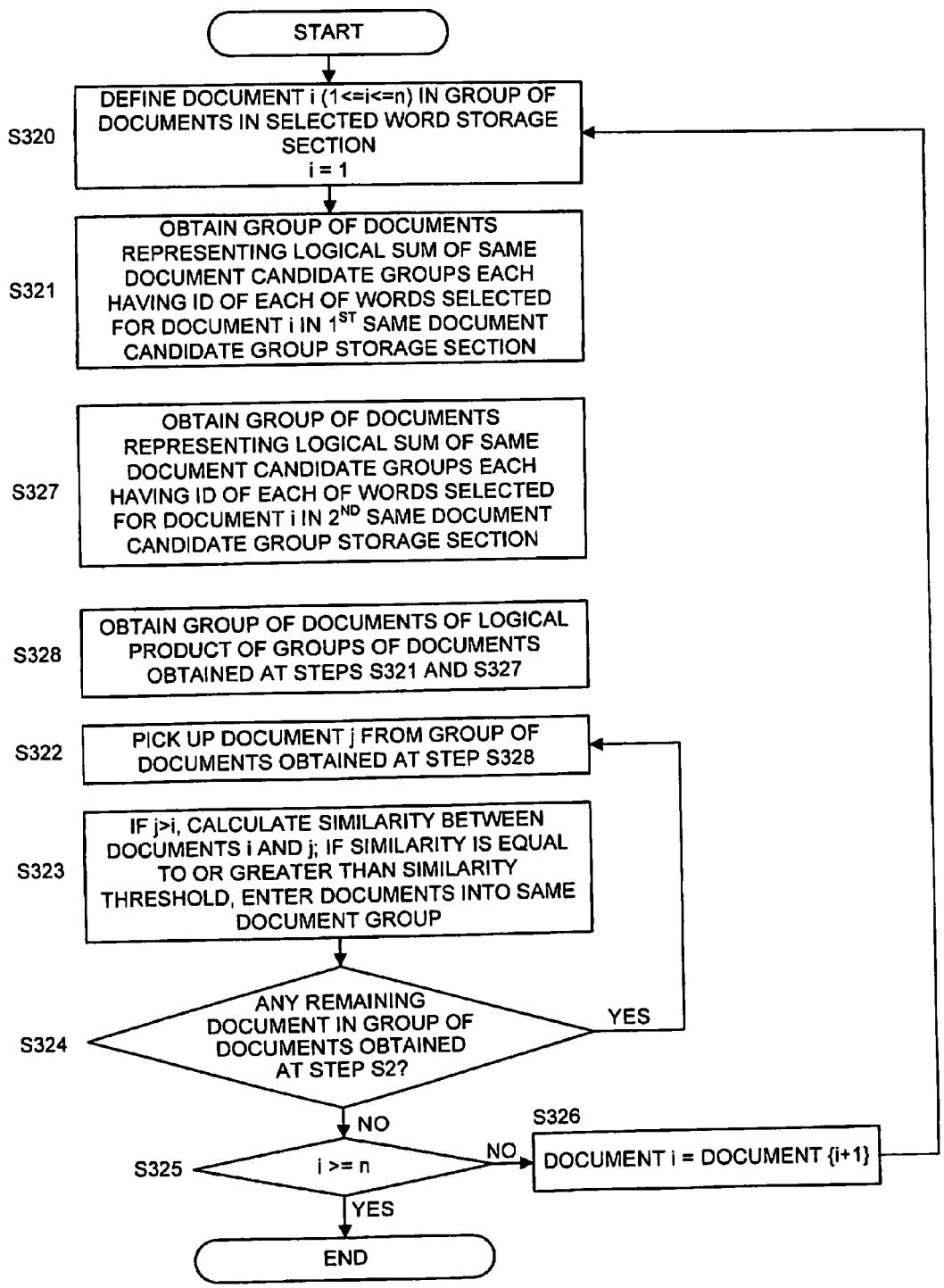
FIG. 34 A flow chart showing an operation of the same document group creating means 12 in the third embodiment of the present invention.

First, a document having a first document ID stored in the selected word storage section is selected (Step S320 in FIG. 34). Since only the document ID is used, either one of the first or second selected word storage section may be selected. The order of selecting documents is irrelevant to practice of the present invention and may be arbitrary. For convenience of explanation, the documents are given ID's from document 1 to document n, and an i-th document is designated as document i.

Next, referring to the first same document candidate group storage section 22, a group of documents representing a logical sum of same document candidate groups each having an ID of each of the words selected for document i is obtained (Step S321 in FIG. 34). For example, for document i=document 1, first selected words for document 1 are {A, L} referring to FIG. 29. Referring to FIG. 28, the groups of documents of the same document candidate groups each having an ID of each of the selected words are: for word A, {document 1, document 4, document 6}; and for word L {document 1, document 4, document 7}. A group of documents representing their logical sum include {document 1, document 4, document 6, document 7}.

Next, referring to the second same document candidate group storage section 22, a group of documents representing a logical sum of same document candidate groups each having an ID of each of the words selected for document i is obtained (Step S327 in FIG. 34). For example, for document i=document 1, second selected words for document 1 are {G, L} referring to FIG. 33. Referring to FIG. 32, the groups of documents of the same document candidate groups each having an ID of each of the selected words are: for word G, {document 1, document 2, document 8, document 9}; and for word L {document 1, document 7}. A group of documents representing their logical sum include {document 1, document 2, document 7, document 8, document 9}

Next, a group of documents representing a logical product of the document groups obtained at Steps S321 and S327 is determined (Step S328 in FIG. 34). For example, for document i=document 1, {document 1, document 4, document 6, document 7} is obtained at Step S321 and {document 1, document 2, document 7, document 8, document 9} is obtained at Step S327 as document groups, and a group of documents representing their logical product is {document 1, document 7}.

Next, document j is picked up from the document group as obtained at Step S328 (Step S322 in FIG. 34). Since the process at Step S322 and thereafter is similar to that at Step S322 and thereafter in FIG. 15 in the first embodiment, description thereof will be omitted here.

The preceding description has been made on the operation in the third embodiment. In the first embodiment, only the first same document candidate group creating means is employed and the example of the word group storage section shown in FIG. 25 requires eighteen operations in similarity calculation as shown in FIG. 35; however, in this embodiment, since the second same document candidate group creating means is employed together, the number of operations in similarity calculation can be reduced to eleven.

While in this embodiment, the same document candidate group creating means 11 is described as being applied twice; however, the embodiment may be easily generalized to a case in which the same document candidate group creating means is applied a more number of times. In operating the same document candidate group creating means 11 for an n-th time, the same document candidate group storage section 22 for an (n−1)-th time may be employed to modify priorities in the priority storage section 21. For example, a higher priority may be given when a weighted sum of the number of documents where a certain word appears, and the total number of documents in which the word is selected by the same document candidate group creating means 11 up to the (n−1)-th time is smaller. Specifically, an n-th score of word 'a', score (a, n), may be represented by:

Score(a, n)=p × (number of documents where 'a' appears)+q × (total number of documents subjected to same document candidate group creation up to (n−1)-th time), and a higher priority is given to a word with a smaller Score. In the equation, p and q are constant real numbers. The same document group creating means 12 may perform the processing of obtaining a group of documents representing a logical sum of same document groups each having an ID of each of the words selected for document i as in Steps S321 and S327 n times to obtain n groups of documents representing logical sums, and obtaining a logical product of the n groups of documents representing logical sums at Step S328.

An effect of the present invention is that it is possible to match same documents at higher speed than in the first embodiment while keeping the effects in the first embodiment. This is because a plurality of the same document candidate group creating means 11 that define priorities of words with different criteria and a plurality of corresponding same document candidate group storage sections 22 are employed, and the same document group creating means 12 calculates the similarity only for document pairs belonging to the identical same document candidate group in any one of all of a plurality of the same document candidate group storage sections 22.

Fourth Embodiment

Figure 36:
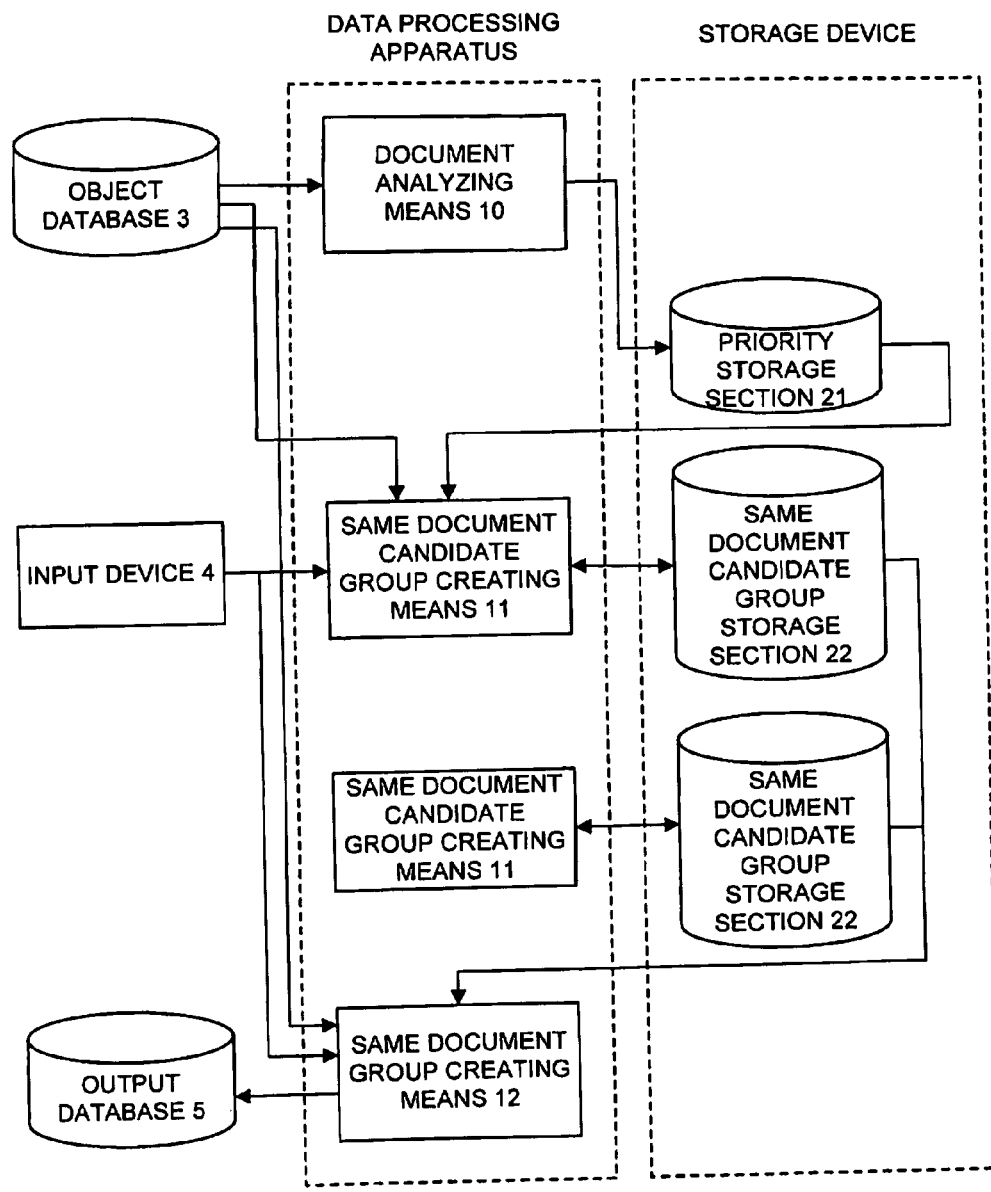
FIG. 36 A block diagram showing a configuration of the fourth embodiment of the present invention.

Referring to FIG. 36, a fourth embodiment of the present invention has a configuration generally similar to that of the second embodiment, except that a plurality of the same document candidate group creating means 11 that define priorities for characters with different criteria, and a plurality of corresponding same document candidate group storage sections 22 are employed, and that the same document group creating means 12 defines a pair of documents having a similarity equal to or greater than the similarity threshold as members of a same document group, or defines a group of documents in which document pairs having a similarity equal to or greater than the similarity threshold and containing common documents are combined, as members of a same document group, among document pairs belonging to the identical same document candidate group in any one of all of a plurality of the same document candidate group storage sections 22.

For the sake of simplifying explanation, FIG. 36 shows two sets of the same document candidate group creating means and the following description of the operation will be made regarding such two sets of the means; however, the present invention is not necessarily limited thereto, and three or more sets of the same document candidate group creating means may be provided.

Figure 37:
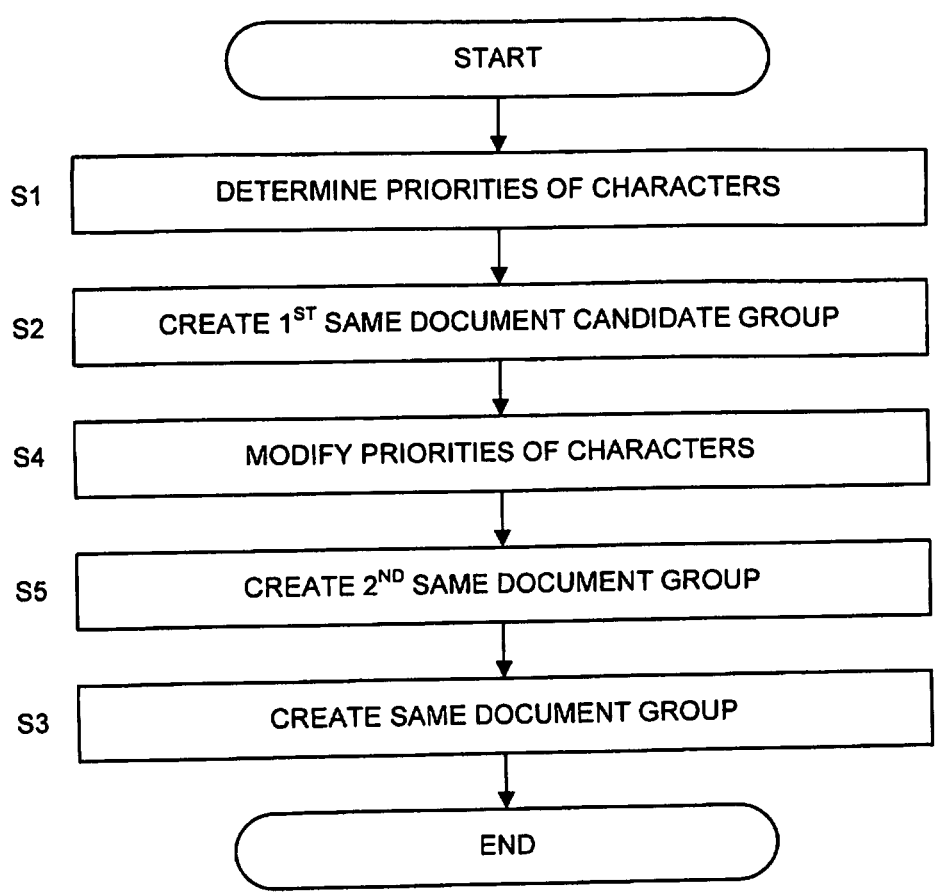
FIG. 37 A flow chart showing an operation of the fourth embodiment of the present invention.

Next, referring to FIG. 37, an operation in the best mode for carrying out the present invention will be described in detail. It should be noted that the following description will be made on a similarity threshold input via the input device 4 of 85%.

First, Step S1 represents an operation of the document analyzing means 10, which is similar to Step S1 in the second embodiment. The following description will be made on an exemplary case in which groups of characters contained in documents 1-10 as shown in FIG. 25 are stored in the object database 3. In this case, the priority of a character is higher for a character with a smaller number of documents where it appears, and for characters with the same number of documents where they appear, a word having a lower character code number, i.e., a word appearing earlier in alphabetical order is given a higher priority, whereupon the characters are stored in the priority storage section 21 with priorities as shown in FIG. 26. For convenience of understanding, similarly to the second embodiment, the following description will be made on the document analyzing means 10 provided for determining priorities; however, in a case that priorities used in the past are reused (that is, priorities are already stored in the priority storage section 21), the function of the document analyzing means 10 for determining priorities is unnecessary and the step of determining priorities is also unnecessary. Moreover, in this embodiment, while a plurality of sets of priorities are employed as will be described regarding Step S4, it is possible to implement a configuration in which only part of priorities are newly determined, and for the rest of the priorities, those determined in the past are reused rather than being newly determined.

Next, at Step S2, a first same document candidate group is created by the first same document candidate group creating means 11. This operation is similar to that at Step S2 in the second embodiment. The description will be made on a case in which the first same document candidate group creating means is applied to the object database 3 in FIG. 25 with priorities in the priority storage section as shown in FIG. 26. Since the similarity threshold is 85%, a minimal number of characters that satisfy (number of characters to be selected)/(number of characters contained in a document)>0.85/(2−0.85) are selected from each document according to Theorem 2-2. Underlined characters are selected from each document as shown in FIG. 27, and are stored in the first same document candidate group storage section as shown in FIG. 28. At that time, correspondence between a document and a group of selected characters is output to the first selected character storage section as shown in FIG. 29.

Next, at Step S4, priorities in the priority storage section 21 are modified using the first same document candidate group storage section 22. While a higher priority is given to a character with a smaller number of documents where it appears at Step S1, a higher priority is given to a character that has a smaller number of documents where it appears and that is less frequently selected at the first same document candidate group creating means 11 at Step S4. For example, a higher priority may be given when a sum of the number of documents where a certain character appears and the number of times of selecting the character by the first same document candidate group creating means 11 is smaller. FIG. 30 shows an example of modifying the priorities in the priority storage section 21 using the first same document candidate group storage section shown in FIG. 28. For example, since the number of documents where character A appears is three and character A is selected three times in the first same document candidate group creating means 11, a sum of these two, that is, 6, is defined as score. In a case that scores are the same, a higher priority is given to a character appearing later in alphabetical order.

Next, at Step S5, a second same document candidate group is created by the second same document candidate group creating means 12. This operation is similar to that at Step S2 in the second embodiment. The description will be made on a case in which the second same document candidate group creating means is applied to the object database 3 in FIG. 25 with priorities in the priority storage section as shown in FIG. 30. Since the similarity threshold is 85%, a minimal number of characters in words that satisfy (number of characters to be selected)/(number of characters contained in a document)>0.85(2−0.85) are selected from each document according to Theorem 2-2. Underlined characters are selected from each document as shown in FIG. 31 and are stored in the second same document candidate group storage section as shown in FIG. 32. At that time, correspondence between a document and a group of selected characters is output to the second selected character storage section as shown in FIG. 33.

Next, at Step S3, the same document group creating means 12 decides a pair of documents having a similarity equal to or greater than the similarity threshold as members of a same document group, or decides a group of documents in which document pairs having a similarity equal to or greater than the similarity threshold and containing common documents are combined, as members of a same document group, among document pairs belonging to the identical same document candidate group in any one of all of a plurality of the same document candidate group storage sections 22, and stores the result into the object database 3.

The operation of the same document group creating means 12 (Step S3) will be described.

The operation at Step S3 will be described in detail with reference to FIG. 38, focusing on a difference from the operation in the second embodiment.

First, a document having a first document ID stored in the selected character storage section is selected (Step S320 in FIG. 38). Since only the document ID is used, either one of the first or second selected character storage section may be selected. The order of selecting documents is irrelevant to practice of the present invention and may be arbitrary. For convenience of explanation, the documents are given ID's from document 1 to document n, and an i-th document is designated as document i.

Next, referring to the first same document candidate group storage section 22, a group of documents representing a logical sum of same document candidate groups each having an ID of each of the characters selected for document i is obtained (Step S321 in FIG. 38). For example, for document i=document 1, first selected characters for document 1 are {A, L} referring to FIG. 29. Referring to FIG. 28, the groups of documents of the same document candidate groups each having an ID of each of the selected characters are: for character A, {document 1, document 4, document 6}; and for character L {document 1, document 4, document 7}. A group of documents representing their logical sum include {document 1, document 4, document 6, document 7}.

Next, referring to the second same document candidate group storage section 22, a group of documents representing a logical sum of same document candidate groups each having an ID of each of the characters selected for document i is obtained (Step S327 in FIG. 38). For example, for document i=document 1, second selected characters for document 1 are {G, L} referring to FIG. 33. Referring to FIG. 32, the groups of documents of the same document candidate groups with an ID of each selected character are: for character G, {document 1, document 2, document 8, document 9}; and for character L {document 1, document 7}. A group of documents representing their logical sum include {document 1, document 2, document 7, document 8, document 9}.

Next, a group of documents representing a logical product of the document groups obtained at Steps S321 and S327 is determined (Step S328 in FIG. 38). For example, for document i=document 1, {document 1, document 4, document 6, document 7} is obtained at Step S321 and {document 1, document 2, document 7, document 8, document 9} is obtained at Step S327 as document groups, and a group of documents representing their logical product is {document 1, document 7}.

Next, document j is picked up from the document group as obtained at Step S328 (Step S322 in FIG. 38). Since the process at Step S322 and thereafter is similar to that at Step S322 and thereafter in FIG. 23 in the second embodiment, description thereof will be omitted here.

The preceding description has been made on the operation in the fourth embodiment. In the second embodiment, only the first same document candidate group creating means 11 is employed and the example of the object database 3 shown in FIG. 24 requires eighteen operations in similarity calculation as shown in FIG. 35; however, in this embodiment, since the second same document candidate group creating means is employed together, the number of operations in similarity calculation can be reduced to eleven.

While in this embodiment, the same document candidate group creating means 11 is described as being applied twice; however, the embodiment may be easily generalized to a case in which the same document candidate group creating means is applied a more number of times. In operating the same document candidate group creating means 11 for an n-th time, the same document candidate group storage section 22 for an (n−1)-th time may be employed to modify priorities in the priority storage section 21. For example, a higher priority may be given when a weighted sum of the number of documents where a certain character appears, and the total number of documents in which the character is selected by the same document candidate group creating means 11 up to the (n−1)-th time is smaller. Specifically, an n-th score of character 'a', score(a, n), may be represented by:

Score(a, n)=p x (number of documents where 'a' appears)+q x (total number of documents in which 'a' is selected by the same document candidate group creating means up to (n−1)-th time), and a higher priority is given to a word with a smaller score. In the equation, p and q are constant real numbers. The same document group creating means 12 may perform the processing of obtaining a group of documents representing a logical sum of same document groups each having an ID of each of the characters selected for document i as in Steps S321 and S327 n times to obtain n groups of documents representing logical sums, and obtain a logical product of the n groups of documents representing logical sums at Step S328.

An effect of the present invention is that it is possible to match same documents at higher speed than in the second embodiment while keeping the effects in the second embodiment. This is because a plurality of same document candidate group creating means 11 that define priorities of characters with different criteria and a plurality of corresponding same document candidate group storage sections 22 are employed, and the same document group creating means 12 calculates the similarity only for document pairs belonging to the identical same document candidate group in any one of all of a plurality of the same document candidate group storage sections 22.

The present application claims priority based on a Japanese Patent Application No. 2006-249429 filed on Sep. 14, 2006, the disclosure of which is incorporated herein in its entirety.

The invention claimed is:

1. A similarity calculation method of calculating a similarity of two different pieces of information having a similarity equal to or greater than a predetermined similarity, comprising:

obtaining, via at least one processor, a proportion of information elements constituting the two different pieces of information that are present in common between information so that the two different pieces of information has a similarity of at least equal to or greater than the predetermined similarity;

determining, via the at least one processor, a selecting number of information elements which is a number of information elements making the similarity of the two different pieces of information less than the predetermined similarity based on said proportion;

selecting, via at least one processor, said selecting number of information elements from said each piece of information in accordance with a first priority in which an information element with a smaller number of said information where it appears has a higher priority;

selecting via at least one processor, a first group of two different pieces of information having no common selected information element between the two different pieces of information;

selecting, via at least one processor, said selecting number of information elements from said each piece of information in accordance with a second priority, criteria of which are different from those of said first priority;

selecting, via at least one processor, a second group of two different pieces of information having no common selected information element between the two different pieces of information; and performing similarity calculation on two different pieces of information except those included in any of said first group and said second group.

2. A similarity calculation method according to claim 1, wherein said information is a document, and said information element is a word or a character contained in said document.

3. A similarity calculation method according to claim 1, wherein:

said second priority is a priority in which an information element with a smaller number of said information where it appears has a higher priority, and an information element, which was rarely selected as the information element in selecting said first pair of information, has a higher priority.

4. A similarity calculation system for calculating a similarity of two different pieces of information having a similarity equal to or greater than a predetermined similarity, comprising:

a priority storage section in which a first and second priorities of information elements constituting information is stored, said priorities being applied in common to a group of information to be subjected to similarity calculation, said first priority being that an information element with a smaller number of said information where it appears has a higher priority, and said second priority being different from said first priority, a priority storage section being a non-transitory medium;

an information element selector that obtains a proportion of information elements constituting the two different pieces of information that are present in common between information so that the two different pieces of information has a similarity of at least equal to or greater than the predetermined similarity, determines a selecting number of information elements which is a number of information elements making the similarity of the two different pieces of information less than the predetermined similarity based on said proportion, selects said selecting number of information elements from said each piece of information in accordance with said first priority, selects a first group of two different pieces of information having no common selected information element between the two different pieces of information, selects said selecting number of information elements from said each piece of information in accordance with said second priority, and selects a second group of two different pieces of information having no common selected information element between the two different pieces of information; and a similarity calculator that calculates similarity calculation on two different pieces of information except those included in any of said first group and said second group.

5. A similarity calculation system according to claim 4, wherein said information is a document, and said information element is a word or a character contained in said document.

6. A similarity calculation system according to claim 4, wherein:

said second priority is a priority in which an information element with a smaller number of said information where it appears has a higher priority, and an information element, which was rarely selected as the information element in selecting said first pair of information, has a higher priority.

7. A same document matching system that forms a group of same documents among given documents, comprising:

a first same document candidate group storage section in which correspondence between a same document candidate group, which is a group of documents distinguished by words or characters and including candidates of same documents, and a document belonging to said same document candidate group is stored, the first same document candidate group storage section being a non-transitory medium;

a second same document candidate group storage section in which correspondence between a same document candidate group, which is a group of documents distinguished by words or characters and including candidates of same documents, and a document belonging to said same document candidate group is stored, the second same document candidate group storage being a non-transitory medium;

a first same document candidate group creator that obtains a proportion of words or characters that are present in common between documents so that the documents have a similarity of at least equal to or greater than a predetermined similarity threshold, determines a selecting number of words or characters in each document based on said proportion, selects said selecting number of words or characters from said documents according to a first priority in which words or characters with a smaller number of documents where they appear have a higher priority, and stores the documents from which said words or characters have been selected into said first same document candidate group storage section, said documents being correlated with a same document candidate group distinguished by each selected word or character;

a second same document candidate group creator that obtains a proportion of words or characters that are present in common between documents so that the documents have a similarity of at least equal to or greater than a predetermined similarity threshold, determines a selecting number of words or characters in each document based on said proportion, selects words or characters from said documents according to a second priority that is different from said first priority, and stores the documents from which said words or characters have been selected into said second same document candidate group storage section, said documents being correlated with a same document candidate group distinguished by each selected word or character; and a same document group creator that calculates a similarity of a pair of documents that are a pair of two different documents stored in said first same document candidate group storage section and correlated with the same document candidate group, calculates a similarity of a pair of documents that are a pair of two different documents stored in said second same document candidate group storage section and correlated with the same document candidate group, and out of pairs of documents belonging to any of said first and said second same document candidate group storage sections, registers a pair of documents that have a similarity equal to or greater than a similarity threshold as a same document group.

8. A same document matching system according to claim 7, comprising same document group creator that calculates a similarity of a document pair that is a pair of two different documents having two different pieces of information correlated with an identical same document candidate group stored in said same document candidate group storage section, and enters a document pair having a similarity equal to or greater than said similarity threshold as members of a same document group.

9. A same document matching system according to claim 8, wherein said same document group creator is configured to combine same document groups containing common documents to create a same document group.

10. A same document matching system according to claim 8, wherein said same document candidate group creator determines said priorities to be higher for a word or character with a smaller number of documents where it appears.

11. A same document matching system according to claim 7, wherein:
said same document candidate group creator and a plurality of said same document candidate group storage sections are provided for each of different priorities; and
said same document group creator is configured to define a pair of documents having a similarity equal to or greater than the similarity threshold as members of a same document group, among pairs of documents belonging to an identical same document candidate group in any one of all of a plurality of the same document candidate group storage sections.

12. A same document matching system according to claim 8, wherein:
the second priority gives a higher priority to words or characters having a smaller weighted sum of a total number of a number of documents where the words or characters appear, and a number of documents in which said words or characters have been selected by the first same document candidate group creator according to said first priority.

13. A same document matching system according to claim 7, wherein said same document candidate group creator is configured to, in selecting a word of a kind such that at least one word is necessarily present in common between documents having a similarity equal to or greater than a similarity threshold from among words contained in a document, select a word group sdi that satisfies:

$sdi \subset di\{(\Sigma tL \in sdiw(tL)^2)/(\Sigma tL \in dw(tL)^2)\} > 1 - ST^2$, from documents di ($0 \leq i \leq n$) (where n is a number of documents to be subjected to identicalness matching) when a similarity threshold is ST ($0 \leq ST \leq L$), where an importance of a word it is defined as w(tL), and a similarity sim(di,dj) of two documents di={tL|0<=L<=|di|} and dj={tL|0<=L<=|dj|} is defined by a cosine similarity as given by:

$sim(di,dj)=(\Sigma tL \in di \cap djw(tL)^2)/(\sqrt{(\Sigma tL \in diw(tL)^2)} * \sqrt{(\Sigma tL \in djw(tL)^2)})$.

14. A same document matching system according to claim 7, wherein the same document candidate group creator is configured to, in selecting a group of characters in a number such that at least one character is necessarily present in common between documents having a similarity equal to or greater than a similarity threshold from among characters contained in a document, select a character group sdi that satisfies:

$sdi \in di\{(\Sigma tL \in sdifq(di,tL))/fq(di) > L - (ST/(2-ST))\}$ from documents di ($0 \leq i \leq n$) (where n is a number of documents to be subjected to identicalness matching) when a similarity threshold is ST ($0 \leq ST \leq 1$), where an edit distance between two documents di={tL|0<=L<=|di|} and dj={tL|0<=L<=|dj|} is defined as edit_dis(di,dj), a number of characters in di is defined as fq(di), and an appearance frequency of tL in di is defined as fq(di,tL), and a similarity sim(di,dj) between di and dj is defined by:

$sim(di,dj)=(fq(di)+fq(dj)-\text{edit\_dis}(di,dj))/(fq(di)+fq(dj))$.

15. A non-transitory computer-readable storage medium storing a similarity calculation program that calculates a similarity of two different pieces of information having a similarity equal to or greater than a predetermined similarity, wherein the program causes information processing to execute the processing of:

obtaining a proportion of information elements constituting the two different pieces of information that are present in common between information so that the two different pieces of information has a similarity of at least equal to or greater than the predetermined similarity;

determining a selecting number of information elements which is a number of information elements making the similarity of the two different pieces of information less than the predetermined similarity based on said proportion;

selecting said selecting number of information elements from said each piece of information in accordance with a first priority in which an information element with a smaller number of said information where it appears has a higher priority;

selecting a first group of two different pieces of information having no common selected information element between the two different pieces of information;

selecting said selecting number of information elements from said each piece of information in accordance with a second priority, criteria of which are different from those of said first priority;

selecting a second group of two different pieces of information having no common selected information element between the two different pieces of information; and performing similarity calculation on two different pieces of information except those included in any of said first group and said second group.

16. A non-transitory computer-readable storage medium storing a same document matching program that forms a group of documents among given documents, wherein the program causes information processing to execute the processing of:

obtaining, for a first same candidate group, a proportion of words or characters constituting two different pieces of information that are present in common between documents so that the documents have a similarity of at least equal to or greater than a predetermined similarity threshold;

determining a selecting number of words or characters in each document based on said proportion;

selecting said selecting number of words or characters from said documents according to a first priority in which words or characters with a smaller number of documents where they appear have a higher priority;

storing the documents from which said words or characters have been selected into a first same document candidate group storage section, said documents being correlated with a same document candidate group distinguished by each selected word or character;

obtaining, for a second same candidate group, a proportion of words or characters that are present in common between documents so that the documents have a similarity of at least equal to or greater than a predetermined similarity threshold;

determining a selecting number of words or characters in each document based on said proportion;

selecting words or characters from said documents according to a second priority that is different from said first priority;

storing the documents from which said words or characters have been selected into a second same document candidate group storage section, said documents being correlated with a same document candidate group distinguished by each selected word or character;

calculating a similarity of a pair of documents that are a pair of two different documents stored in said first same document candidate group storage section and correlated with the same document candidate group;

calculating a similarity of a pair of documents that arc a pair of two different documents stored in said second same document candidate group storage section and correlated with the same document candidate group, and out of pairs of documents belonging to any of said first and said second same document candidate group storage sections; and registering a pair of documents that have a similarity equal to or greater than a similarity threshold as a same document group.

* * * * *